US009020741B2

(12) United States Patent
Tsuda

(10) Patent No.: US 9,020,741 B2
(45) Date of Patent: Apr. 28, 2015

(54) DRIVING SUPPORT SYSTEM, DRIVING SUPPORT METHOD, AND IN-VEHICLE UNIT

(75) Inventor: Yoshiaki Tsuda, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/395,580

(22) PCT Filed: Nov. 2, 2010

(86) PCT No.: PCT/JP2010/069498
§ 371 (c)(1),
(2), (4) Date: Mar. 12, 2012

(87) PCT Pub. No.: WO2011/058909
PCT Pub. Date: May 19, 2011

(65) Prior Publication Data

US 2012/0173130 A1 Jul. 5, 2012

(30) Foreign Application Priority Data

Nov. 10, 2009 (JP) ................................ 2009-256667

(51) Int. Cl.
*G06F 19/00* (2011.01)
*G08G 1/0967* (2006.01)

(52) U.S. Cl.
CPC .... *G08G 1/096716* (2013.01); *G08G 1/096741* (2013.01); *G08G 1/096783* (2013.01)

(58) Field of Classification Search
CPC .................. G08G 1/096716; G08G 1/096741; G08G 1/096783
USPC .................. 701/117; 340/905, 991; 342/412; 455/574
See application file for complete search history.

(56) References Cited

U.S. PATENT DOCUMENTS 6,744,745 B1 6/2004 Fukui
8,456,324 B2 * 6/2013 Tsuda .......................... 340/905
(Continued)

FOREIGN PATENT DOCUMENTS

CN 1508762 A 6/2004
CN 101488287 A 7/2009
(Continued)

OTHER PUBLICATIONS

International Search Report issued Jan. 25, 2011 in PCT/JP10/69498 filed Nov. 2, 2010.
(Continued)

*Primary Examiner* — Helal A Algahaim
*Assistant Examiner* — Nga X Nguyen
(74) *Attorney, Agent, or Firm* — Oblon, McClelland, Maier & Neustadt, L.L.P.

(57) ABSTRACT

Traffic information is provided to an in-vehicle unit of a vehicle located in a shadow portion of a large-sized vehicle and to an in-vehicle unit of a vehicle at a location separated from an intersection 193. A UHF beacon unit 112 is installed at the intersection 193, thereby distributing the traffic information using a UHF beacon signal having a diffraction characteristic. This arrangement can allow the in-vehicle unit of the vehicle located in the shadow portion of the large-sized vehicle as well to receive the traffic information. Further, since the UHF signal propagates far, this arrangement can allow the in-vehicle unit of the vehicle at the location separated from the intersection 193 as well to receive the traffic information. The UHF beacon unit 112 transmits, to a plurality of concentric zones, UHF beacon signals with different traffic information set therein for the different zones, by time division. At this time, the UHF beacon unit 112 transmits the UHF beacon signals with the different traffic information set therein, with different transmission output powers.

2 Claims, 15 Drawing Sheets

(56) References Cited

U.S. PATENT DOCUMENTS

| | | | |
|---|---|---|---|
| 2010/0034426 | A1 | 2/2010 | Takiguchi et al. |
| 2011/0006914 | A1 | 1/2011 | Tsuda |

FOREIGN PATENT DOCUMENTS

| | | | | |
|---|---|---|---|---|
| JP | 2001-160195 | A | | 6/2001 |
| JP | 2007 219588 | | | 8/2007 |
| JP | 2007 251287 | | | 9/2007 |
| JP | 2007 281867 | | | 10/2007 |
| JP | 2008 249555 | | | 10/2008 |
| JP | 2008 283580 | | | 11/2008 |
| JP | 2008-283580 | A | | 11/2008 |
| JP | 2008 288940 | | | 11/2008 |
| JP | 2008-288940 | A | | 11/2008 |
| JP | 2008288940 | A | * | 11/2008 |
| JP | 2009-44672 | A | | 2/2009 |
| JP | 2009 188883 | | | 8/2009 |
| JP | 2009 211397 | | | 9/2009 |
| WO | 2008 099915 | | | 8/2008 |
| WO | 2009 119637 | | | 10/2009 |

OTHER PUBLICATIONS

Japanese Office Action issued Apr. 2, 2013 in Patent Application No. 2011-540476 with Partial English Translation.

Office Action issued on Jan. 6, 2014 in the corresponding Chinese Patent Application No. 201080050987.8 (with English Translation).

* cited by examiner

DRIVING SUPPORT SYSTEM, DRIVING SUPPORT METHOD, AND IN-VEHICLE UNIT

TECHNICAL FIELD

The present invention relates to a driving support system, a driving support method, and an in-vehicle unit that support safety driving by providing traffic information by, e.g., a UHF (Ultra-High Frequency) wave.

BACKGROUND ART

At present, verification experiments of driving safety support systems (DSSS: Driving Safety Support Systems) have been carried out so as to prevent traffic accidents caused by carelessness of drivers, which occur at intersections and on approach roads to the intersections.

The DSSS, for example, are systems which provide to a driver a traffic condition around the driver in the form that may be visually and acoustically recognized (such as a display of an alerting image or an output of an alerting voice message) and call attention to a dangerous factor. Relaxed driving is thereby supported.

The DSSS include an apparatus on a road side having a transmitter (hereinafter referred to as an optical beacon unit) that transmits an optical signal, a transmitter (hereinafter referred to as a DSRC beacon unit) that transmits an electric wave of a 5.8 GHz band, and a roadside control unit (information relay and determination device).

The DSSS further include an in-vehicle unit that exchanges data with the optical beacon unit and the DSRC beacon unit.

The DSSS includes a detection sensor and a signal controller, as apparatuses on the road side. The detection sensor detects the position of a vehicle, the speed of the vehicle, the number of vehicles, the number of pedestrians, and the like, and the signal controller controls the traffic density at the intersection. A vehicle detection sensor which detects distances of a four-wheeled vehicle and an automatic two-wheeled vehicle to an intersection and running speeds of the four-wheeled and automatic two-wheeled vehicles as they enter the intersection, and a pedestrian detection sensor which detects a pedestrian walking on a crosswalk within the intersection and a bicycle running on the crosswalk, are examples of the detection sensor. The roadside control unit collects signal information from the signal controller and the detected information from the detection sensor, and transmits those information to the optical beacon unit and the DSRC beacon unit.

The optical beacon unit is installed before the intersection. The optical beacon unit transmits to the vehicle the position of a lane on which the vehicle is running and provision of a DSSS service. The optical beacon unit further provides to the vehicle static information (hereinafter referred to as fixed information) such as geographical information on the size of the intersection, presence or absence of a side road, through the in-vehicle unit.

The roadside control unit (information relay and determination device) collects information on the position of an oncoming vehicle entering the intersection, information on the speed of the oncoming vehicle, and information on the presence of the pedestrian or the bicycle on the crosswalk within the intersection, from the detection sensors. The roadside control unit further collects information on the color of a traffic light output from the signal controller. The roadside control unit also prepares, based on the collected information, traffic information (intersection information) that changes real time and transmits the prepared information to the DSRC beacon unit.

The DSRC beacon unit is installed in the vicinity of the intersection, and provides to the vehicle the traffic information that has been prepared by the roadside control unit.

Using the above-mentioned DSSS, a right-turn accident prevention service and a left-turn hit accident prevention service, for example, have been evaluated and verified.

CITATION LIST

Patent Literature

Patent Literature 1: JP 2007-219588
Patent Literature 2: JP 2009-211397
Patent Literature 3: JP 2007-281867
Patent Literature 4: WO 2008/099915
Patent Literature 5: JP 2008-249555

SUMMARY OF INVENTION

Technical Problem

The above-mentioned DSSS have a problem that the in-vehicle unit of a vehicle located in a shadow portion (hereinafter referred to as shadowing) of a large-sized vehicle such as a truck or a bus cannot receive the information from the DSRC beacon unit at the intersection.

A driving safety support service (such as a rear-end collision prevention service) using the DSSS can only be provided in the vicinity of the intersection. It is desired, however, that the driving safety support service be provided to a vehicle having an in-vehicle unit at a position separated from the intersection (by 100 m or more) as well.

For example, an object of the present invention is to allow an in-vehicle unit of a vehicle located in a shadow portion of a large-sized vehicle as well to receive traffic information.

For example, a further object of the present invention is to allow an in-vehicle unit of a vehicle running at a location separated from an intersection as well to receive traffic information.

Solution to Problem

A driving support system of the present invention includes a UHF (Ultra High Frequency) roadside apparatus and an in-vehicle unit mounted in a vehicle, wherein the UHF roadside apparatus includes:

a UHF transmission part which transmits traffic information for a circular region centering on the UHF roadside apparatus and traffic information for a doughnut-shaped region surrounding the circular region, in a time-division manner using a UHF wave, and wherein the in-vehicle unit mounted in the vehicle includes:

a UHF reception part which receives the UHF wave transmitted by the UHF roadside apparatus;

a position specifying part which specifies a position of the vehicle;

a region specifying part which specifies a region where the vehicle is located, of the circular region and the doughnut-shaped region, based on the position of the vehicle specified by the position specifying part;

a UHF selection part which selects, of the UHF wave received by the UHF reception part, a UHF wave received during a time assigned to the region specified by the region specifying part; and a traffic information acquiring part which acquires traffic information from the UHF wave selected by the UHF selection part.

Advantageous Effects of Invention

According to the present invention, traffic information may be provided to the in-vehicle unit of a vehicle located in the shadow portion of a large-sized vehicle due to a diffraction wave property of the UHF wave, for example.

Further, according to the present invention, traffic information may be received by the in-vehicle unit of a vehicle running at a location separated from an intersection, due to a propagation loss characteristic of the UHF wave, for example.

DESCRIPTION OF EMBODIMENTS

Embodiment 1

Driving safety support systems 100 that use three communication media of an optical beacon, a DSRC beacon, and a UHF beacon will be described.

Figure 1:
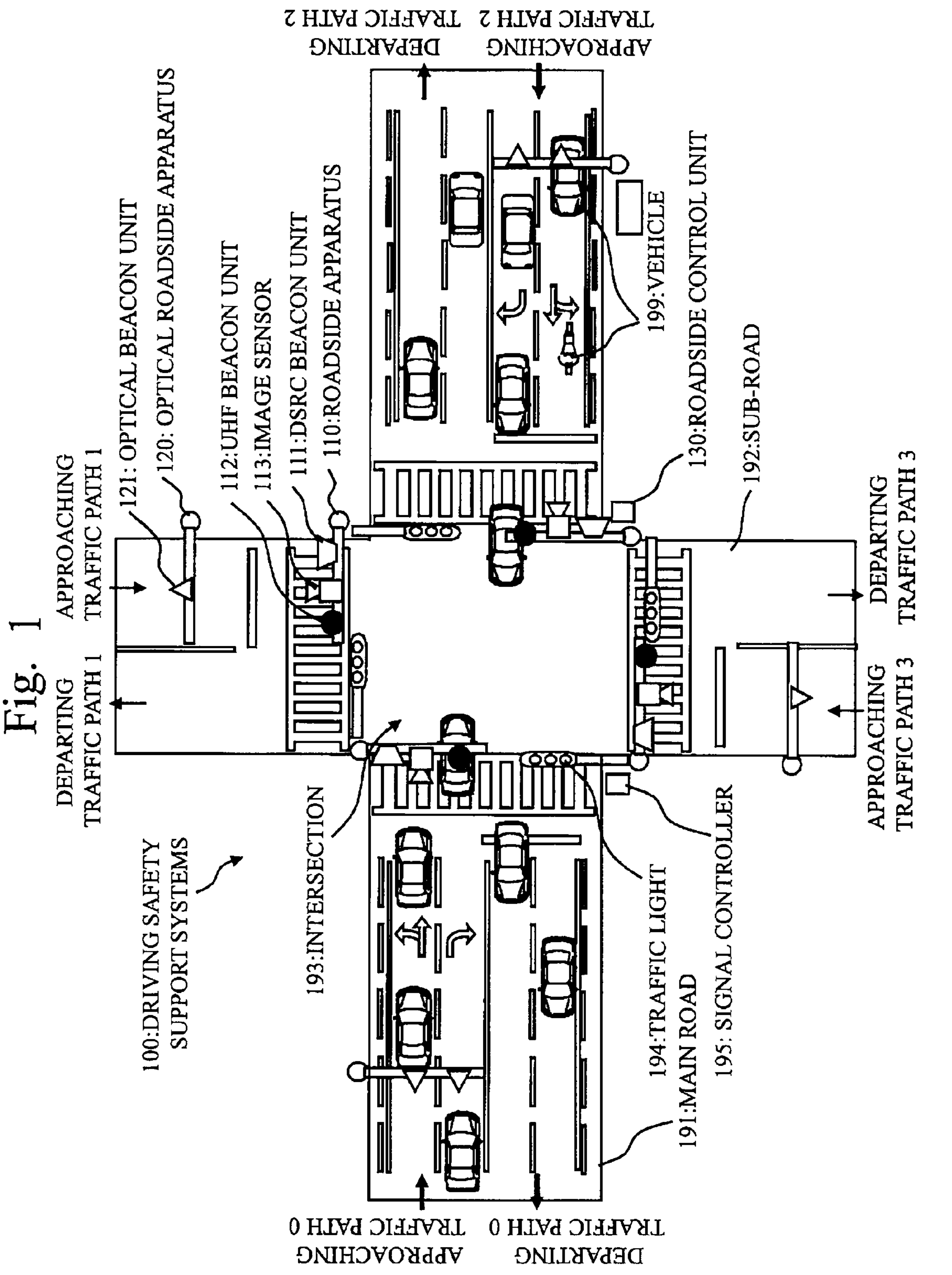
FIG. 1 is a diagram showing a configuration of driving safety support systems 100 in Embodiment 1.

FIG. 1 is a diagram showing a configuration of the driving safety support systems 100 in Embodiment 1.

The configuration of the driving safety support systems 100 in Embodiment 1 will be described below, based on FIG. 1.

The driving safety support systems 100 are also referred to as DSSS or ITS (Intelligent Transport Systems).

The driving safety support systems 100 include, for example, a roadside apparatus 110, an optical roadside apparatus 120, a roadside control unit 130, and a signal controller 195, and provide traffic information to an in-vehicle unit of a vehicle 199 running at an intersection 193 or at a location separated from the intersection 193.

Each of the roadside apparatus 110, the optical roadside apparatus 120, the roadside control unit 130, the signal controller 195, and the in-vehicle unit comprises a CPU (Central Processing Unit) (also referred to as a central processing unit, an arithmetic unit, a microprocessor, or a microcomputer), and executes each processing using the CPU. Each of the roadside apparatus 110, the optical roadside apparatus 120, the roadside control unit 130, the signal controller 195, and the in-vehicle unit includes a storage device (also referred to as a memory), and stores each information using the storage device. A RAM (Random Access Memory) or a magnetic disk device is an example of the storage device.

The roadside apparatus 110, the optical roadside apparatus 120, the roadside control unit 130, and the signal controller 195 are connected by a communication cable and communicate one another through the communication cable.

The signal controller 195 is connected to each traffic light 194 at the intersection 193 through the communication cable, and controls a color and a turned-on time of each traffic light 194 through the communication cable, based on predetermined control information. The signal controller 195 transmits the control information on each traffic light 194 to the roadside control unit 130. The control information on the traffic light 194 is stored in the storage device of the traffic light controller 195 in advance, or is transmitted from a traffic control center that is an upper-level equipment of the traffic light controller 195.

The optical roadside apparatus 120 is installed before the intersection 193, includes an optical beacon unit 121 for each traffic lane (lane), and transmits an optical beacon (optical wave) signal to the in-vehicle unit of a vehicle 199 that runs below each optical beacon unit 121. The optical roadside apparatus 120 sets static traffic information in the optical beacon signal transmitted from each optical beacon unit 121. Examples of the static traffic information include coordinate values of the optical beacon unit 121, information on lanes (such as a straight lane, a left-turn lane, and a right-turn lane), information indicating provision of a DSSS service at an entry destination intersection, a distance to the intersection, the size of the intersection, and presence or absence of a side road. The static traffic information is stored in the storage device of the optical roadside apparatus 120 in advance.

The in-vehicle unit of each vehicle 199 receives the optical beacon signal in which the static traffic information has been set, from the optical beacon unit 121 installed above the lane on which the vehicle is running. The in-vehicle unit obtains the static traffic information from the received optical beacon signal. The in-vehicle unit of each vehicle 199 transmits an optical beacon signal in which driving information has been set, to the optical beacon unit 121. The speed, whether a blinker is on or not, the type of the vehicle, and an in-vehicle unit ID (IDentifier) are examples of the driving information.

The optical beacon unit 121 receives the driving information from the in-vehicle unit of the vehicle 199. The optical roadside apparatus 120 transmits the driving information received through the optical beacon unit 121 to the roadside control unit 130.

The optical beacon unit 121 may also be referred to as the optical roadside apparatus 120.

The roadside control unit 130 generates the traffic information, based on, for example, the control information on the traffic light 194 received from the signal controller 195, the driving information on a running vehicle received from the optical roadside apparatus 120, identification information on the running vehicle and identification information on a pedestrian or a bicycle that have been received from an image sensor 113 which will be described later. The roadside control unit 130 transmits the generated traffic information to each roadside apparatus 110.

For example, the roadside control unit 130 generates the traffic information in the following manner.

Based on the control information on the traffic light 194, the roadside control unit 130 sets a period of time in which the color of the traffic light 194 changes from blue to red, in the traffic information as dynamic information.

Based on the driving information on the running vehicle and the identification information on the running vehicle, the roadside control unit 130 sets the information on a running vehicle on each lane, in the traffic information as the dynamic information.

The roadside control unit 130 sets, for example, the information on the lanes at the intersection and information on the side road in the traffic information, in the traffic information as the static information. The static traffic information is stored in the storage device of the roadside control unit 130 in advance.

The roadside control unit 130 sets the time-division information of a UHF beacon unit 112 that will be described later, in the traffic information. The time-division information on the UHF beacon is stored in the storage device of the roadside control unit 130 in advance.

The roadside apparatus 110 (DSRC roadside apparatus, UHF roadside apparatus) comprises a DSRC beacon unit 111, a UHF beacon unit 112, and the image sensor 113, and is installed at an entrance of an intersection.

The roadside apparatus 110 transmits to the roadside control unit 130 the identification information of, for example, the running vehicle, the pedestrian, or the bicycle, detected by the image sensor 113. The roadside apparatus 110 transmits the traffic information transmitted from the roadside control unit 130 to the in-vehicle unit of each vehicle 199 using the DSRC beacon unit 111 and the UHF beacon unit 112.

The DSRC beacon unit 111 and the UHF beacon unit 112 may be respectively referred to as a DSRC roadside apparatus and a UHF roadside apparatus.

The DSRC beacon unit 111 sets the traffic information generated by the roadside control unit 130, in an electric wave (DSRC beacon) of a 5.8 GHz band, and transmits the electric wave with the traffic information set thereon to the in-vehicle unit of each vehicle 199, as a DSRC beacon signal.

The DSRC beacon is an example of a microwave, and is also referred to as an SHF (Super High Frequency) wave.

The UHF beacon unit 112 sets the traffic information generated by the roadside control unit 130, on a UHF beacon (an electric wave of a 700 MHz band, for example), and transmits the UHF beacon with the traffic information set thereon to the in-vehicle unit of each vehicle 199 as a UHF beacon signal.

The UHF beacon is an example of an electric wave or microwave.

The image sensor 113 captures an image of a running lane (left lane), performs image processing of the captured image, and detects presence or absence of a running vehicle and the type of the running vehicle (such as a large-sized vehicle, a standard-sized vehicle, or a two-wheeled vehicle). When collecting information on the crosswalk at the intersection, the image sensor 113 is installed at a location where an image of the crosswalk may be captured. The image sensor 113 captures an image of a pedestrian or a bicycle traveling on the crosswalk, and image processing of the captured image is performed to detect presence or absence of the pedestrian or bicycle. In the image processing, presence or absence of a running vehicle and the type of the running vehicle are detected by pattern matching or comparison with an image obtained when no vehicle is running. In the pattern matching, a shape or a color pattern indicating a vehicle is detected from the image. Similarly, presence or absence of a pedestrian or a bicycle is also detected.

The in-vehicle unit of each vehicle 199 receives the optical beacon signal transmitted from the optical beacon unit 121, the DSRC beacon signal transmitted from the DSRC beacon unit 111, and the UHF beacon signal transmitted from the UHF beacon unit 112. The in-vehicle unit of each vehicle 199 obtains the traffic information from each beacon signal that has been received. Then, the in-vehicle unit executes various safe driving support processes, based on the obtained traffic information.

For example, the in-vehicle unit executes the safe driving support processes in the following manner.

The in-vehicle unit updates coordinates of a current location used by a car navigation system (hereinafter referred to as a car-navi) by coordinate values set in the traffic information in the optical beacon signal.

The in-vehicle unit displays the lane information on the running lane or the distance to the intersection, set in the traffic information in the optical beacon signal on a display device (hereinafter referred to as a screen) of the car-navi or outputs the lane information or the distance as a voice message.

The in-vehicle unit calculates the time taken for entering the intersection 193, based on the distance to the intersection 193 set in the traffic information in the optical beacon signal and a running speed measured within the vehicle 199. The in-vehicle unit outputs a voice message prompting deceleration or performs deceleration of the vehicle 199, based on the calculated time taken for entering the intersection and the time taken for a change of the color of the traffic light into red. The time taken for a change of the color of the traffic light into red is set in the traffic information in a DSRC beacon signal and a UHF beacon signal.

The in-vehicle unit judges the presence of a straight-running vehicle (such as a two-wheeled vehicle) that is hidden behind a large-sized vehicle and is difficult to be seen from the driver, based on the information on running vehicles set in a DSRC beacon signal and a UHF beacon signal. When a straight-running vehicle is present on the opposite lane, an alert is given to the driver by the in-vehicle unit in the form of an output of a voice message or screen display when the vehicle is to turn right. With this arrangement, the number of collisions between a right-turning vehicle and a straight-running vehicle (hereinafter referred to as right-turn accidents) may be reduced.

The in-vehicle unit judges the presence of a two-wheeled vehicle running straight from behind, based on the information on running vehicles set in a DSRC beacon signal and a UHF beacon signal. When a two-wheeled vehicle running straight from behind is present, an alert is given to the driver by the in-vehicle unit in the form of a voice message or screen display as the vehicle 199 is to turn left. This may reduce the number of left-turn hit accidents.

Figure 2:
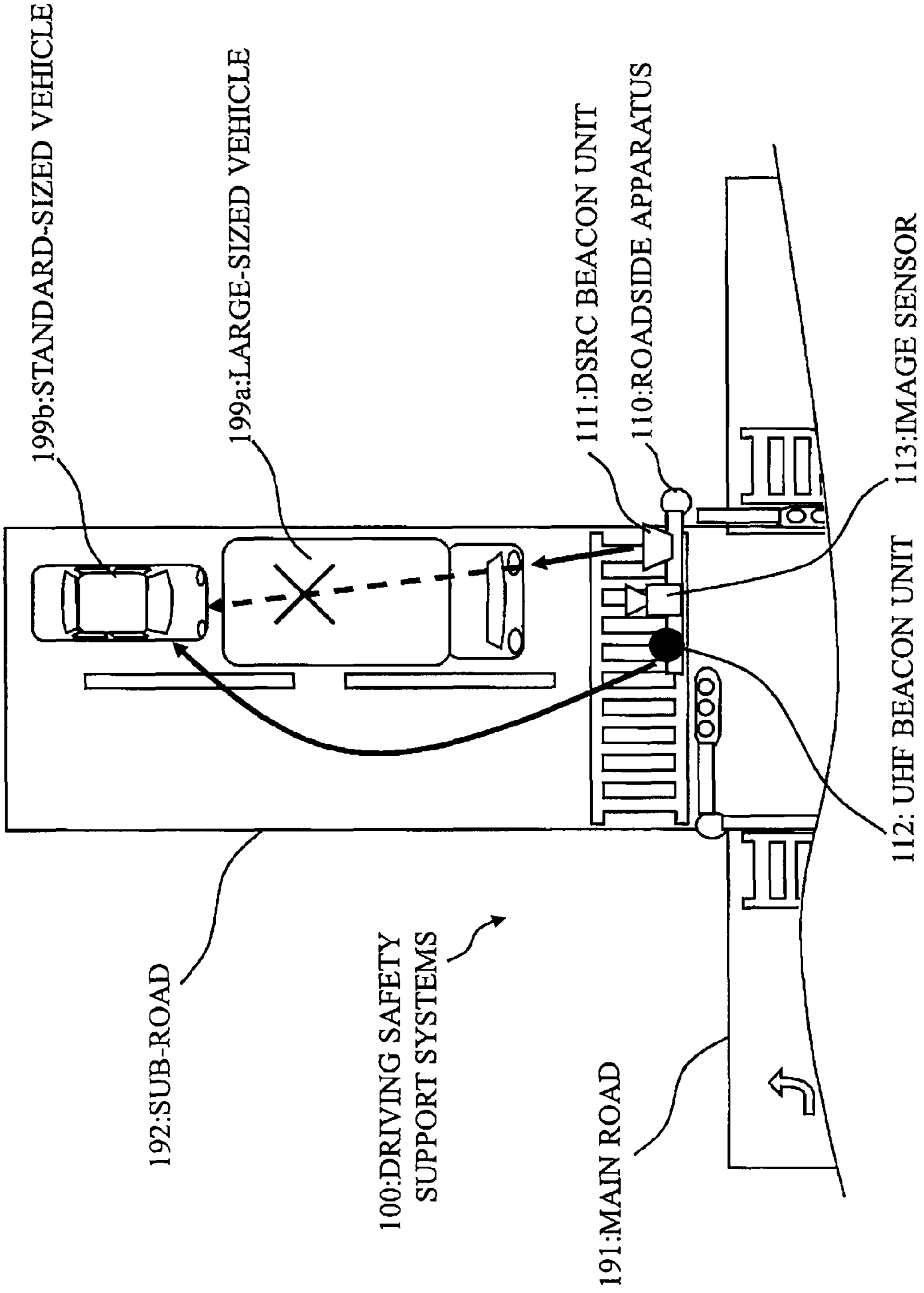
FIG. 2 is a diagram showing distribution of traffic information by the driving safety support systems 100 at a time of shadowing in Embodiment 1.

FIG. 2 is a diagram showing distribution of the traffic information by the driving safety support systems 100 in Embodiment 1 at a time of shadowing.

Distribution of the traffic information by the driving safety support systems 100 in Embodiment 1 at the time of shadowing will be described below with reference to FIG. 2.

When a large-sized vehicle 199*a* is present before the road-side apparatus 110 and a standard-sized vehicle 199*b* is present just behind the large-sized vehicle 199*a*, a DSRC beacon signal transmitted from the DSRC beacon unit 111 does not reach the standard-sized vehicle 199*b*, because the DSRC beacon signal has a comparatively strong rectilinearity and accordingly is blocked by the large-sized vehicle 199*a*.

On the other hand, since the UHF beacon signal transmitted from the UHF beacon unit 112 has a diffraction wave property, the UHF beacon signal reaches the standard-sized vehicle 199*b*.

In the driving safety support systems 100 in Embodiment 1, the traffic information is distributed using the UHF beacon. In other words, the traffic information may be thereby distributed to a blocked region (shadowing region) to which a DSRC beacon cannot distribute the traffic information.

Figure 3:
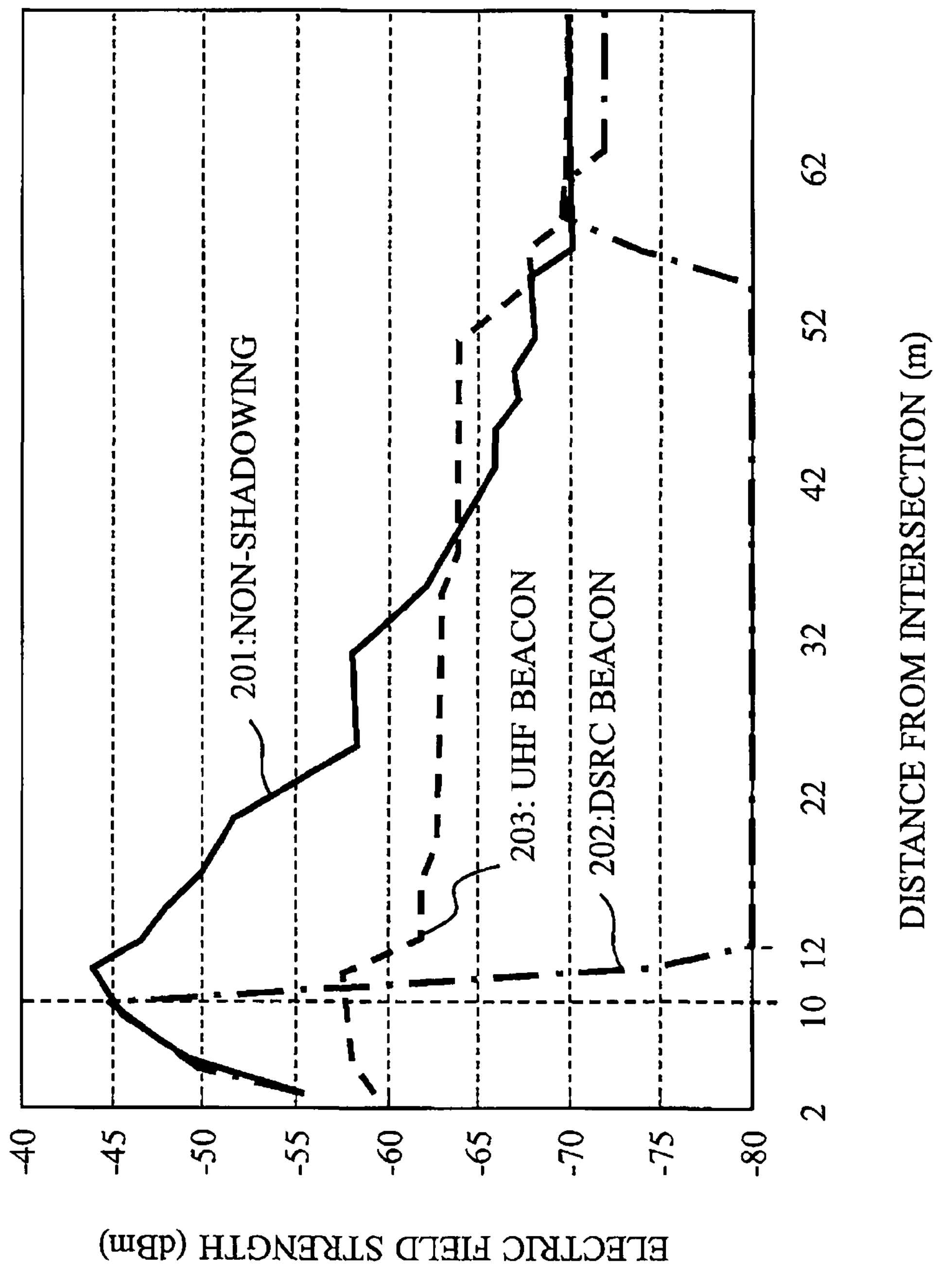
FIG. 3 is a graph showing an electric field strength characteristic of a DSRC beacon at the time of non-shadowing, an electric field strength characteristic of a DSRC beacon at the time of shadowing, and an electric strength characteristic of a UHF beacon at the time of shadowing.

FIG. 3 is a graph showing an electric field strength characteristic of a DSRC beacon at a time of non-shadowing, an electric field strength characteristic of a DSRC beacon at a time of shadowing, and an electric field strength characteristic of a UHF beacon at the time of shadowing.

The electrical field strength characteristic of the DSRC beacon at the time of non-shadowing, the electric field strength characteristic of the DSRC beacon at a time of shadowing, and the electric field strength characteristic of a UHF beacon at the time of shadowing will be described below with reference to FIG. 3.

In shadowing, the beacon is shielded. In non-shadowing, the beacon is not shielded.

FIG. 3 shows the electric field strength of a DSRC beacon 202 at a time of shadowing and the electric field strength of a UHF beacon 203 at a time of shadowing, which are measured when the large-sized vehicle 199*a* is disposed at a location separated from an intersection by approximately 10 meters.

FIG. 3 also shows the electric field strength of the DSRC beacon at a time of non-shadowing (non-shadowing 201) which is measured when the large-sized vehicle 199*a* is not disposed.

The electric field strength of the DSRC beacon 202 behind the large-sized vehicle 199*a* (at a location that is distant by 10 or more meters from the intersection) is very small. The DSRC beacon 202 is not therefore received by the in-vehicle unit of the standard-sized vehicle 199*b* positioned behind the large-sized vehicle 199*a*. This is because the DSRC beacon 202 has a stronger rectilinearity than the UHF beacon 203, and is blocked by the large-sized vehicle 199*a*.

On the other hand, the electric field strength of the UHF beacon 203 is sufficiently maintained so that reception of the UHF beacon 203 by the in-vehicle unit is possible. Thus, the UHF beacon 203 can be received by the in-vehicle unit of the standard-sized vehicle 199*b* located behind the large-sized vehicle 199*a*. This is because the UHF beacon 203 has a stronger diffraction wave property than the DSRC beacon 202.

The transmission rate of the DSRC beacon (which is approximately 4 Mbps) is faster than the transmission rate of the UHF beacon (which is approximately 1.5 Mbps). Thus, the DSRC beacon may distribute an image or a sound that has a large data size and would be difficult to distribute by the UHF beacon.

Then, in the driving safety support systems 100 in Embodiment 1, the necessary but minimum amount of the traffic information that is highly important is distributed in the form of text data, using the UHF beacon. Then, all of the traffic information is distributed in the form of text data, image data, and sound data, using the DSRC beacon. For example, an image captured by the image sensor 113, an animation that will be displayed on a car-navi screen for alerting, or a warning voice message that will be output within the vehicle 199 may be distributed, using the DSRC beacon.

In Embodiment 1, by using the UHF beacon, the traffic information that indicates a high importance level may be distributed to the vehicle 199 located in the shadowing region. By using the DSRC beacon, more traffic information may be distributed to the vehicle 199 located in a non-shadowing region.

In Embodiment 1, the driving safety support systems 100 as follows were described.

The UHF beacon unit 112 is disposed in the vicinity of the DSRC beacon unit 111, and the traffic information (such as intersection information) is provided using the DSRC beacon and the UHF beacon.

With this arrangement, even if communication between the DSRC beacon unit 111 and the in-vehicle unit cannot be performed due to shadowing, the traffic information may be provided to the in-vehicle unit by the UHF beacon unit 112 by using the diffraction wave property of the UHF beacon.

Embodiment 2

The following feature will be described wherein, by utilizing a long-distance communication characteristic (propagation loss characteristic) of the UHF beacon, driving safety support systems 100 distributes different traffic information to a plurality of distribution zones according to the distance from a UHF beacon unit 112.

The distribution zones are regions obtained by sectioning the communication-capable range (electric wave reach range) of the UHF beacon concentrically to center on the UHF beacon unit 112.

The configuration of the driving safety support systems 100 is the same as that of Embodiment 1.

Figure 4:
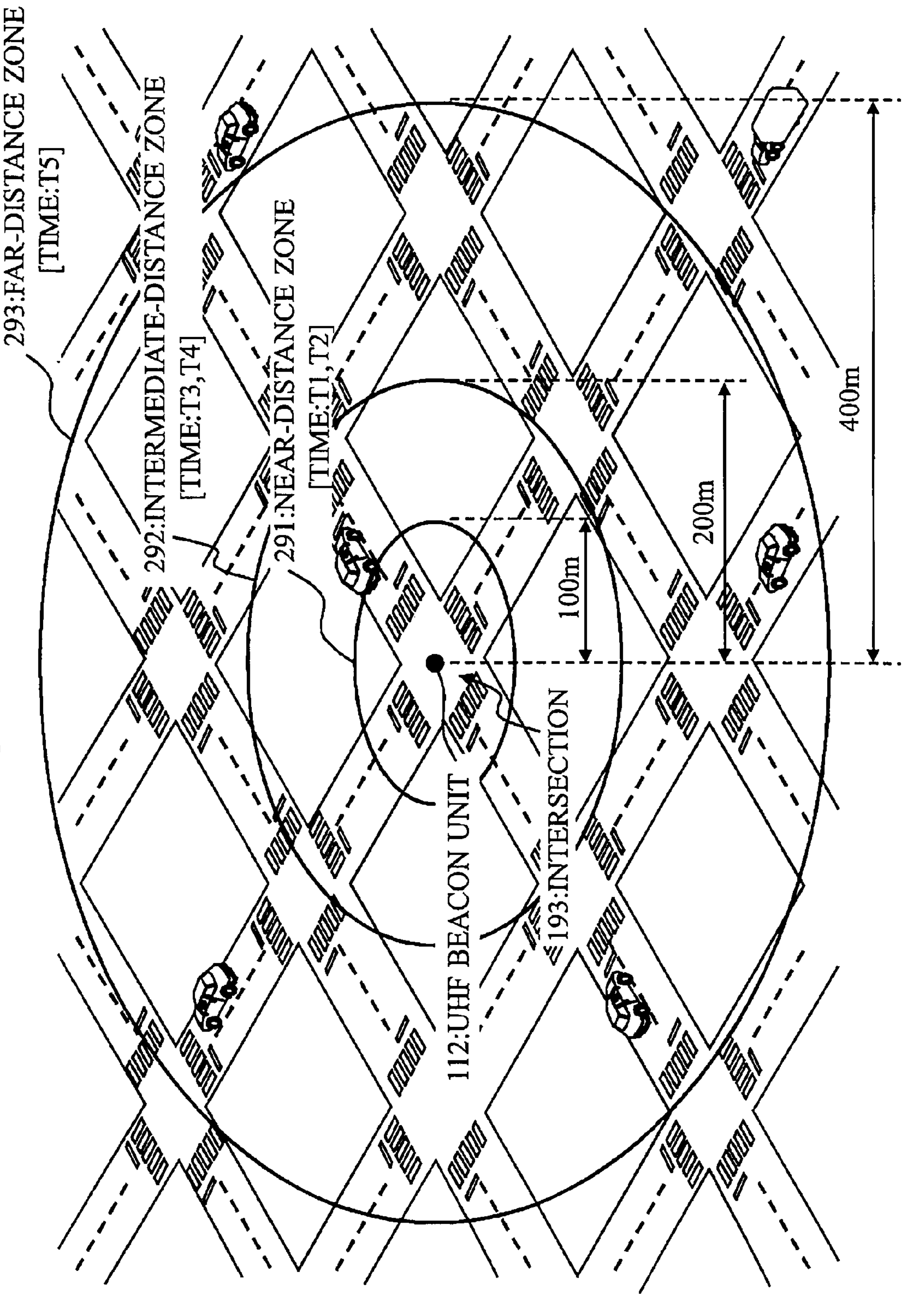
FIG. 4 is a diagram showing a distribution zone of traffic information by a UHF beacon in Embodiment 2.

FIG. 4 is a diagram showing a distribution zone of traffic information by a UHF beacon in Embodiment 2.

With reference to FIG. 4, an embodiment will be described wherein three distribution zones are provided for one UHF beacon unit 112. In FIG. 4, the UHF beacon unit 112 may be treated as four UHF beacon units 112 disposed at an intersection (see FIG. 1).

The reach range of the UHF beacon is divided into three zones of a near-distance zone 291, an intermediate-distance zone 292, and a far-distance zone 293. The near-distance zone 291 is the closest to the UHF beacon unit 112. In the intermediate-distance zone 292, a distance from the UHF beacon unit 112 is farther than in the near-distance zone 291. In the far-distance zone 293, a distance from the UHF beacon unit 112 is farther than in the intermediate-distance zone 292.

The near-distance zone 291, the intermediate-distance zone 292, and the far-distance zone 293 are concentric (or annular) regions centering on the UHF beacon unit 112.

Assume that a range with a radius of approximately 100 meters from the UHF beacon unit 112 is defined as the near-distance zone 291. A range with a radius of approximately 200 meters from the UHF beacon unit 112 (excluding the near-distance zone 291) is defined as the intermediate-distance zone 292. A range with a radius of approximately 400 meters from the UHF beacon unit 112 (excluding the near-distance zone 291 and the intermediate-distance zone 292) is defined as the far-distance zone 293. Namely, a ratio among farthest distances of the respective zones from the UHF beacon unit 112 is set to 1:2:4.

The traffic information for the near-distance zone, the traffic information for the intermediate-distance zone, and the traffic information for the far-distance zone are set in UHF beacons, and are distributed in different times.

For example, a predetermined period is divided into five times T1 to T5. Traffic information for a near-distance zone is distributed in the times T1 and T2. Traffic information for an intermediate-distance zone is distributed in the times T3 and T4. Traffic information for a far-distance zone is distributed in the time T5.

The UHF beacon is distributed with an electric wave strength corresponding to the farthest distance of the zone.

More specifically, the UHF beacon in which the traffic information for the near-distance zone is set is transmitted with an electric wave strength just enough to reach the farthest distance of the near-distance zone 291. The UHF beacon in which the traffic information for the intermediate-distance zone is set is transmitted with an electric wave strength just enough to reach the farthest distance of the intermediate-distance zone 292. The UHF beacon in which the traffic information for the far-distance zone is set is transmitted with an electric wave strength just enough to reach the farthest distance of the far-distance zone 293.

The UHF beacons each set with the traffic information are transmitted to the respective zones with the same frequency (the frequency band).

More specifically, the frequency of the UHF beacon for the near-distance zone 291, the frequency of the UHF beacon for the intermediate-distance zone 292, and the frequency of the UHF beacon for the far-distance zone are the same.

Alternatively, different zones may have UHF beacons with different frequencies.

For example, as the transmission frequency of the UHF beacon, a frequency within a frequency band of 715.0 to 725.0 MHz is employed. This frequency band is the band that is employed by the analog television terrestrial broadcast which is to be discontinued as of Jul. 24, 2012, and will be available for use after the discontinuation of the broadcast.

The traffic information may be distributed with the same frequency as that used for communication between in-vehicle units (vehicle-to-vehicle communication). Namely, a common communication frequency may be employed for communication (road-to-vehicle communication) between the roadside apparatus (UHF beacon unit 112) and the in-vehicle unit, and communication (vehicle-to-vehicle communication) between the in-vehicle units. This can simplify the function of the in-vehicle unit, because as far as the in-vehicle unit can receive one frequency, it is capable of road-to-vehicle communication as well as vehicle-to-vehicle communication.

The far-distance traffic information for the far-distance zone includes DSSS system information (or service information) and road information on the far-distance zone 293. The DSSS system information includes presence or absence of provision of the traffic information (presence or absence of provision of service), time-division information indicating the time assigned to each zone, and zone information indicating the range of each zone. The range of each zone is represented by a distance from the intersection 193 or the UHF beacon unit 112, the radius of each zone, or absolute coordinates. The DSSS system information and the road information on the far-distance zone 293 are static information set in advance.

The traffic information for the intermediate-distance zone includes road information on the intermediate-distance zone 292 and traffic restriction information on the near-distance zone 291. The traffic restriction information on the near-distance zone 291 is information indicating a caution against a congestion, an accident, or a road construction work that may have occurred in the near-distance zone 291 at a time of entering the near-distance zone 291. The road information on the intermediate-distance zone 292 is static information set in advance. The traffic restriction information on the near-distance zone 291 is dynamic information that is updated at any time.

The traffic information for the near-distance zone includes information on the intersection 193. The information on the intersection 193 is information indicating a caution when entering into the intersection 193, and includes information on an oncoming vehicle, information on a two-wheeled vehicle running along a roadside, information on the numbers of pedestrians and bicycles on a crosswalk, control information on a traffic light, and the like. Information on the intersection 193 is dynamic information that is updated real time.

Figure 5:
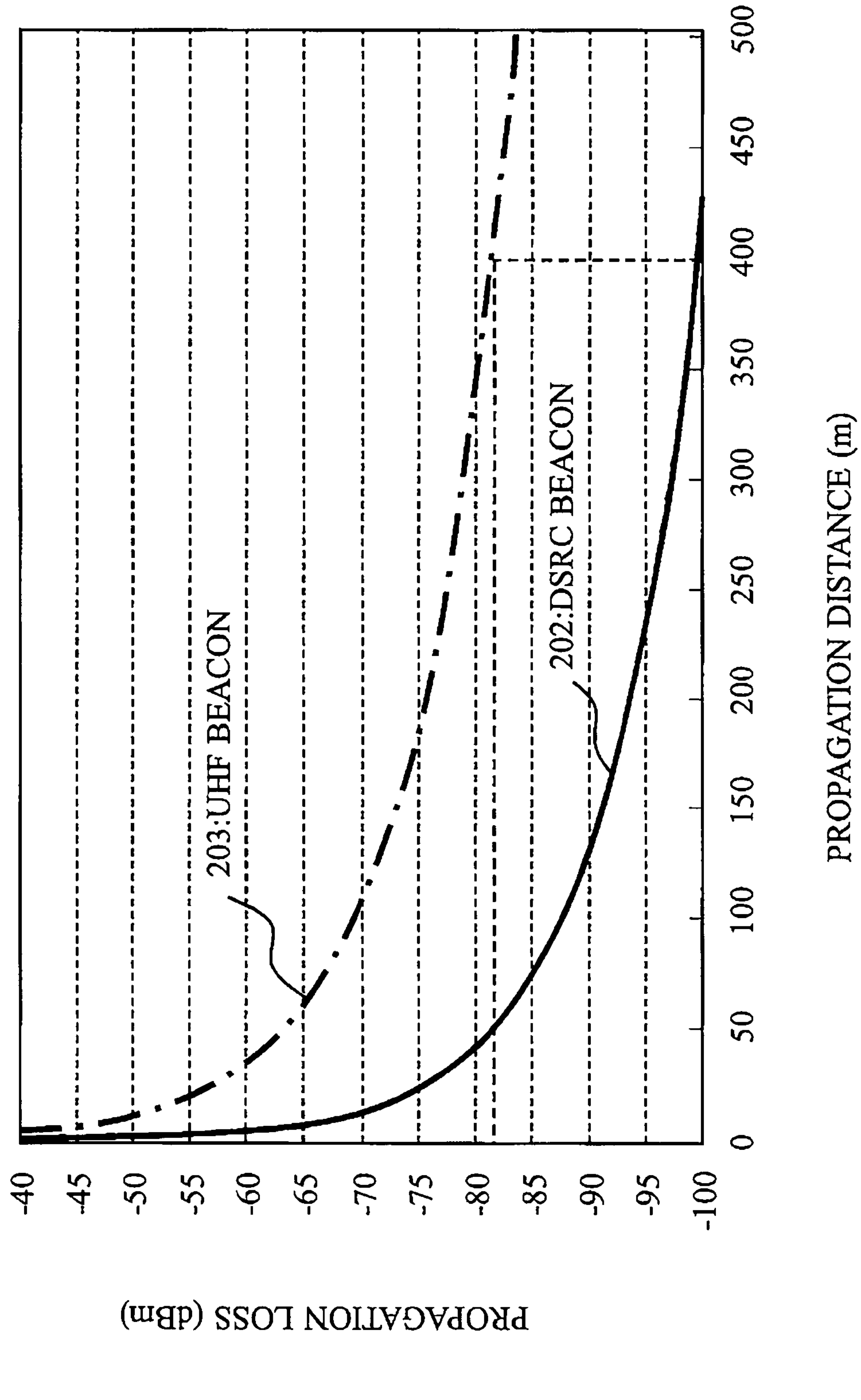
FIG. 5 is a graph showing propagation loss characteristics of a DSRC beacon and a UHF beacon.

FIG. 5 is a graph showing propagation loss characteristics of the DSRC beacon 202 and the UHF beacon 203.

As shown in FIG. 5, the UHF beacon 203 has a smaller electric field strength loss (propagation loss) with respect to a propagation distance than the DSRC beacon 202.

To take an example, the transmission loss of the UHF beacon 203 is on the order of "−80 dBm" at a location where the propagation distance is 400 meters. Thus, the in-vehicle unit can receive a UHF beacon 203 even at a location separated from the UHF beacon unit 112 by 400 meters.

Figure 6:
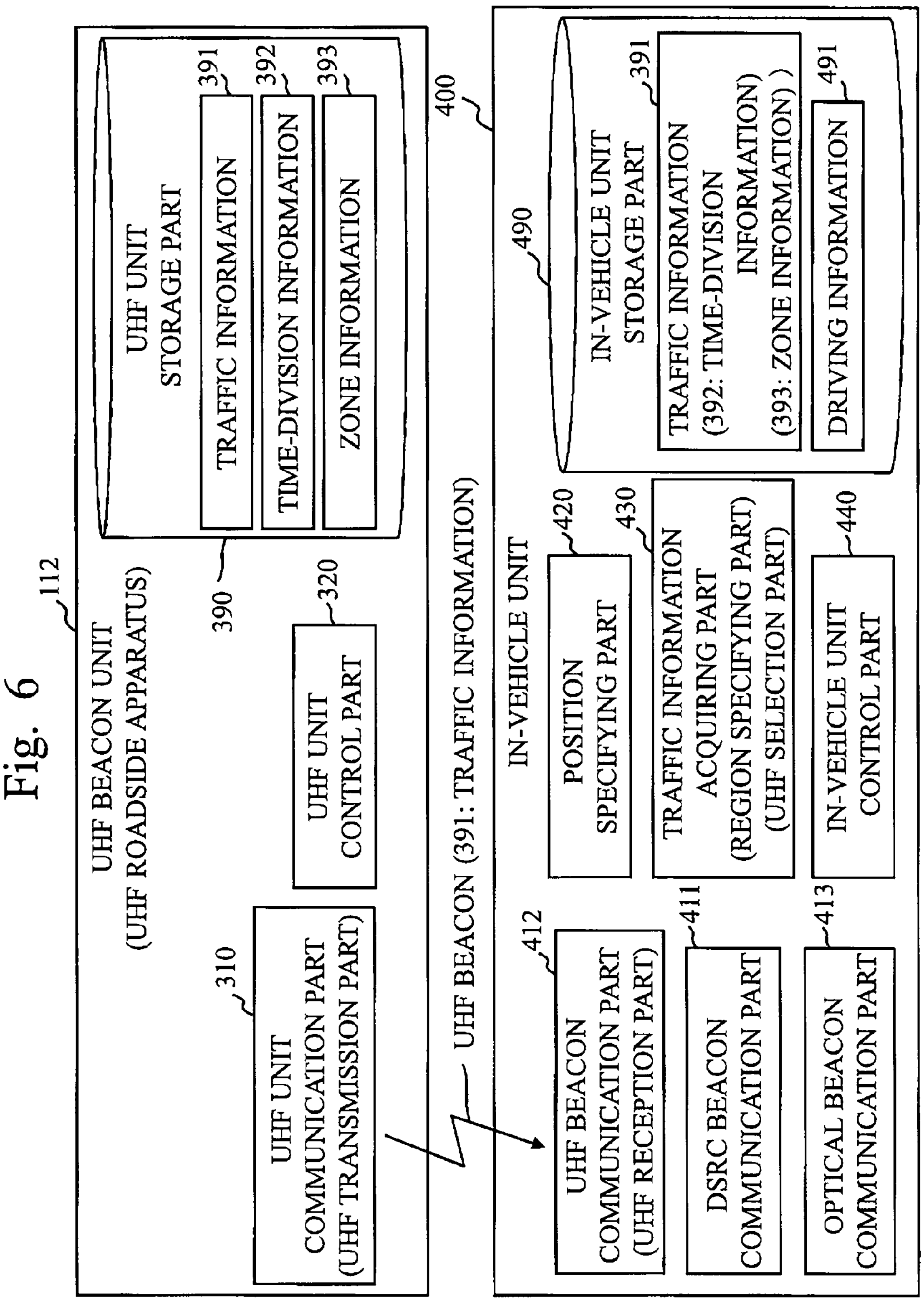
FIG. 6 is a diagram showing the function and configuration of a UHF beacon unit 112 and an in-vehicle unit 400 in Embodiment 2.

FIG. 6 is a diagram showing the function and configuration of the UHF beacon unit 112 and an in-vehicle unit 400 in Embodiment 2.

The function and configuration of the UHF beacon unit 112 and in-vehicle unit 400 of Embodiment 2 will be described hereinafter with reference to FIG. 6.

The UHF beacon unit 112 (an example of the UHF roadside apparatus) comprises a UHF unit communication part 310 (an example of the UHF transmission part), a UHF unit control part 320, and a UHF unit storage part 390.

The UHF unit communication part 310 transmits and receives UHF beacon distribution information.

For example, the UHF unit communication part 310 transmits traffic information 391 in the following manner using the UHF beacon.

The UHF unit communication part 310 sets (modifies) the traffic information 391 in the UHF beacon and transmits the UHF beacon distribution information in which the traffic information 391 is set.

The UHF unit communication part 310 transmits traffic information 391 for a circular region (the near-distance zone 291) having the UHF beacon unit 112 as the center and traffic information 391 for a doughnut-shaped region (the intermediate-distance zone 292) surrounding the circular region, in a time-division manner (TDMA: Time Division Multiple Access) using the UHF beacon (UHF wave). The doughnut-shaped region is a ring-shaped or annular region (see FIG. 4).

The UHF unit communication part 310 transmits the traffic information 391 for the circular region (the near-distance zone 291), the traffic information 391 for the first doughnut-shaped region (the intermediate-distance zone 292) surrounding the circular region, and traffic information 391 for the second doughnut-shaped region (the far-distance zone 293)

surrounding the first doughnut-shaped region, in a time-division manner using the UHF beacon.

The UHF unit communication part 310 transmits the traffic information 391 for the respective regions in a time-division manner using the UHF beacon that generates an electric wave strength in accordance with the distance between the UHF roadside apparatus and the corresponding region.

The UHF unit communication part 310 transmits the traffic information 391 for the respective regions in a time-division manner using the UHF beacons having the same frequency.

The UHF unit control part 320 controls the UHF beacon unit 112.

For example, the UHF unit control part 320 acquires traffic information 391 for the respective zones from the roadside control unit 130.

The UHF unit control part 320 also acquires predetermined time-division information 392 indicating, for each zone, the time (timing) to transmit the UHF beacon distribution information in which the traffic information 391 is set, from the roadside control unit 130.

The UHF unit control part 320 also acquires zone information 393 indicating the ranges of the respective zones from the roadside control unit 130.

The UHF unit storage part 390 stores data to be used by the UHF beacon unit 112.

The traffic information 391, the time-division information 392, and the zone information 393 are examples of data to be stored in the UHF unit storage part 390.

The in-vehicle unit 400 comprises a DSRC beacon communication part 411, a UHF beacon communication part 412 (an example of a UHF reception part), an optical beacon communication part 413, a position specifying part 420, a traffic information acquiring part 430 (an example of a region specifying part and UHF selection part), an in-vehicle unit control part 440, and an in-vehicle unit storage part 490.

The DSRC beacon communication part 411 transmits and receives DSRC beacon distribution information.

For example, the DSRC beacon communication part 411 receives DSRC beacon distribution information in which traffic information is set, from a DSRC beacon unit 111.

The optical beacon communication part 413 transmits and receives optical beacon distribution information.

For example, the optical beacon communication part 413 receives optical beacon distribution information in which the traffic information is set, from an optical beacon unit 121.

The optical beacon communication part 413 also transmits optical beacon distribution information in which driving information is set, to the optical beacon unit 121.

The UHF beacon communication part 412 transmits and receives UHF beacon distribution information.

For example, the UHF beacon communication part 412 receives the UHF beacon distribution information transmitted by the UHF beacon unit 112.

The position specifying part 420 specifies the vehicle position in accordance with a predetermined method.

For example, the position specifying part 420 specifies the vehicle position in the following manner.

The position specifying part 420 acquires a position measurement result of the GPS (Global Positioning System) from the car-navi.

Using the speed, acceleration, and angular velocity of the vehicle measured by a car speed detection unit (odometer) or an inertial unit (IMU: Inertial Measurement Unit) provided to the vehicle, the position specifying part 420 calculates the position (coordinates) of the vehicle by the dead reckoning process.

Using the image captured by a camera provided to the vehicle, the position specifying part 420 calculates the position of the vehicle based on the positional relationship with respect to a feature (a white line, a road sign, and the like) displayed on the image. Patent Literatures 4 and 5 each disclose a position measuring method based on the image.

The traffic information acquiring part 430 acquires traffic information 391 on the region (zone) where the vehicle is located, in the following manner.

Based on the vehicle position specified by the position specifying part 420, the traffic information acquiring part 430 specifies the region (zone) where the vehicle is located.

The traffic information acquiring part 430 selects, among UHF beacon distribution information received by the UHF beacon communication part 412, UHF beacon distribution information received within the time assigned to the specified region.

The traffic information acquiring part 430 acquires (demodulates) the traffic information 391 from the selected UHF beacon distribution information.

The in-vehicle unit control part 440 controls the in-vehicle unit 400.

For example, the in-vehicle unit control part 440 outputs the traffic information acquired by the traffic information acquiring part 430 to the car-navi and the driving control unit. The car-navi outputs the traffic information by displaying it on the screen or producing voice. The driving control unit controls the driving of the vehicle based on the traffic information.

The in-vehicle unit control part 440 also acquires driving information 491 such as the velocity or whether the car turning indicator is on or off.

The in-vehicle unit storage part 490 stores data to be used by the in-vehicle unit 400.

The traffic information 391 (including the time-division information 392 and zone information 393) and the driving information 491 (including the velocity, whether the car turning indicator is on or off, the vehicle type, and the in-vehicle unit ID) are examples of the data to be stored in the in-vehicle unit storage part 490.

Figure 7:
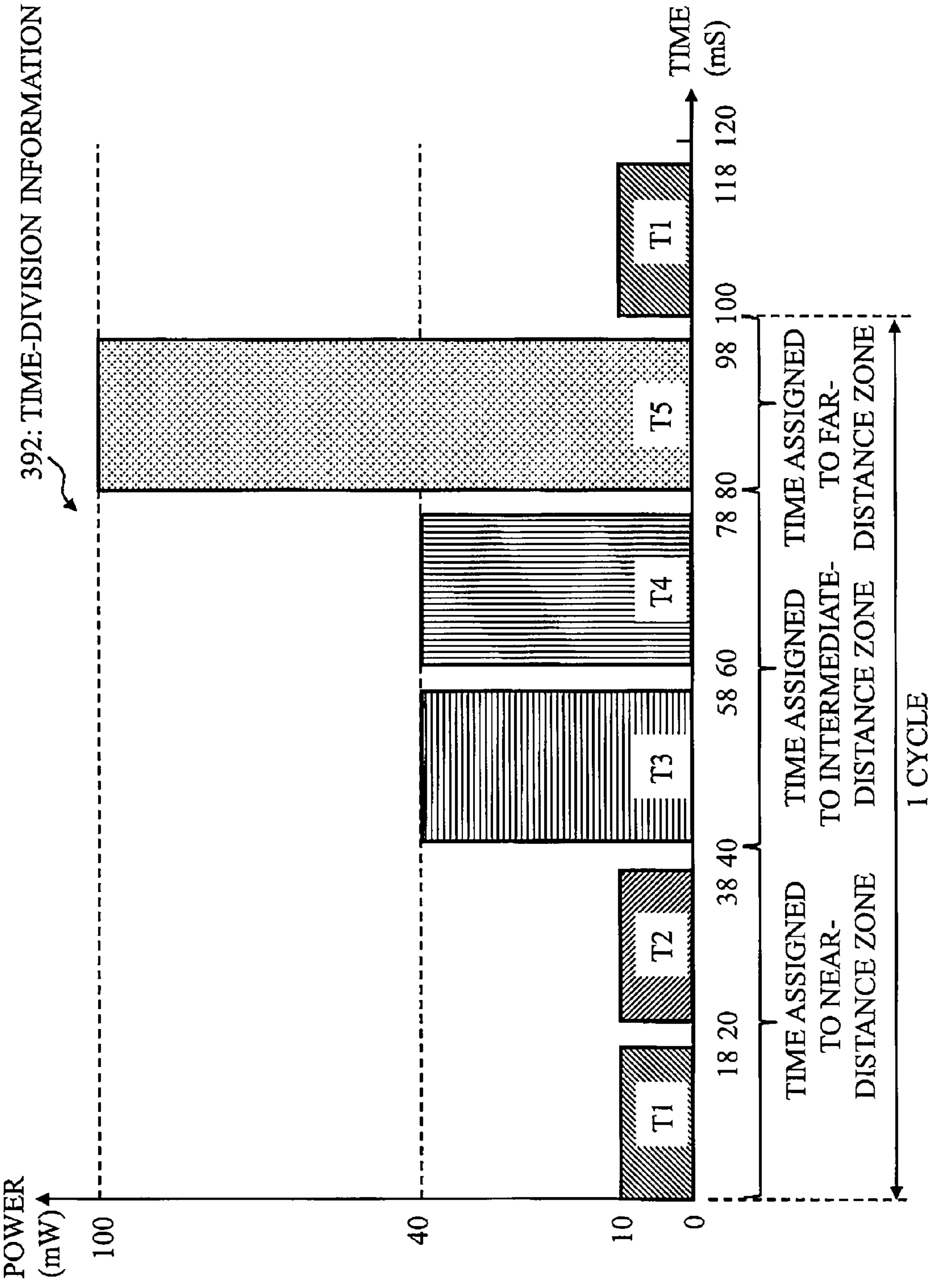
FIG. 7 is a graph showing time-division information 392 and transmission strength of the UHF beacon in Embodiment 2.
Figure 8:
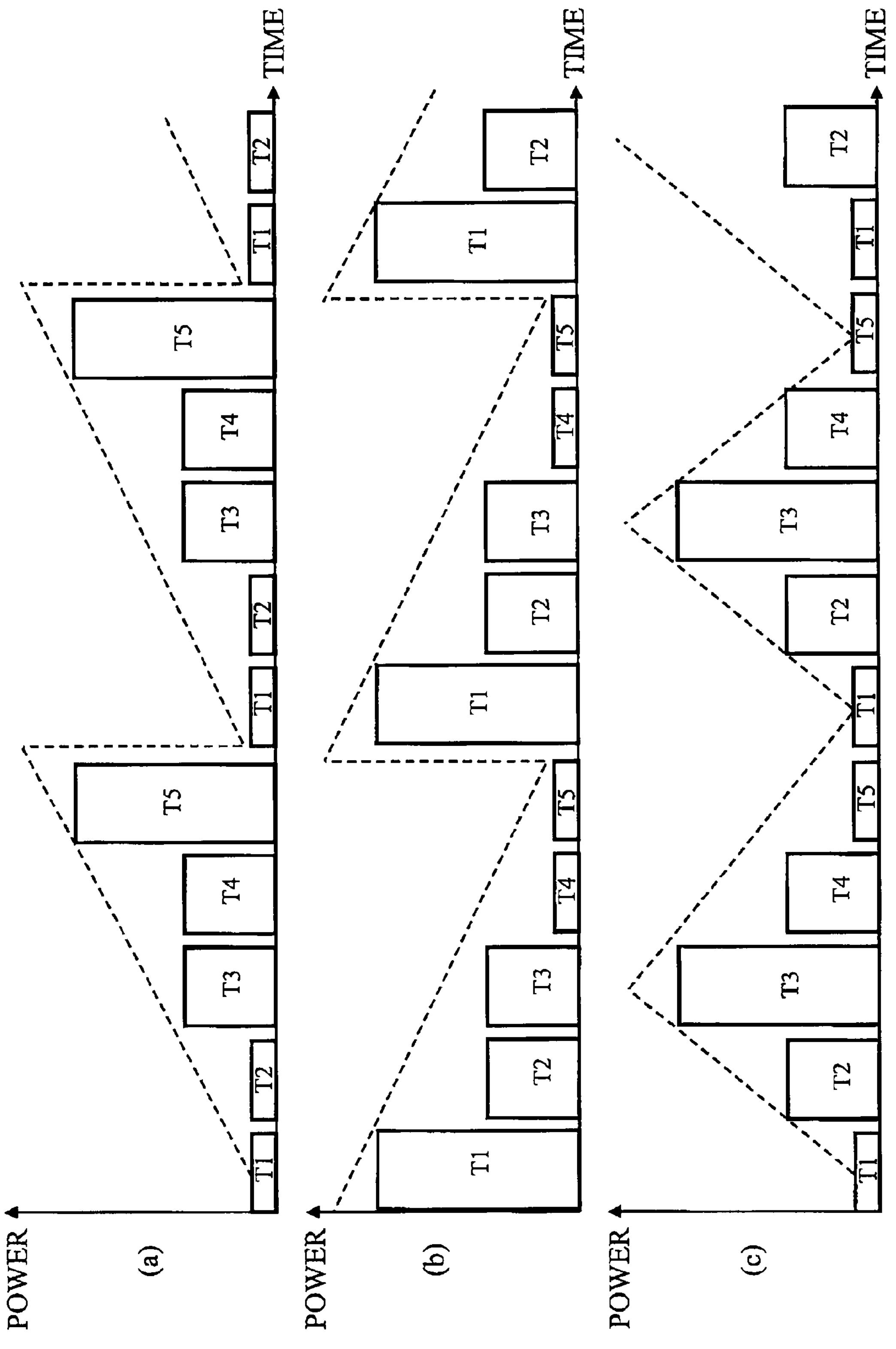
FIG. 8 is a graph showing the time-division information 392 and transmission strength of the UHF beacon in Embodiment 2.

FIGS. 7 and 8 are graphs showing the time-division information 392 and transmission strength of the UHF beacon in Embodiment 2.

Examples of the time-division information 392 and transmission strength of the UHF beacon in Embodiment 2 will now be described with reference to FIGS. 7 and 8.

The graphs of FIGS. 7 and 8 show the times assigned to the respective zones and the electric wave strengths of the UHF beacons to be transmitted to the respective zones. The axis of abscissa represents the time, and the axis of ordinate represents the electric wave strength (power) of the UHF beacon.

The time-division information 392 is predetermined information that shows, for each zone, the time (timing) to transmit the UHF beacon in which the traffic information 391 is set.

As shown in FIG. 7, the time (100 milliseconds) necessary for updating the traffic information 391 is determined as a one cycle time. One cycle (100 milliseconds) is divided into 5 times each consisting of 20 milliseconds. Of each time (20 milliseconds), 18 milliseconds are reserved as UHF beacon transmission time (T1 to T5), and the remaining 2 milliseconds are reserved for the gap (interval, pause time, or time interval) between adjacent times.

When the times T1 and T2 are assigned to the near-distance zone 291, the HF beacon in which the traffic information 391 for the near-distance zone is set is transmitted with a predetermined electric wave strength (of e.g., 10 milliwatts) just enough to reach the entire near-distance zone 291 in the times T1 and T2.

When the times T3 and T4 are assigned to the intermediate-distance zone 292, the UHF beacon in which the traffic information 391 for the intermediate-distance zone is set is transmitted with a predetermined electric wave strength (of e.g., 40 militates) just enough to reach the entire intermediate-distance zone 292 in the times T3 and T4.

When the time T5 is assigned to the far-distance zone 293, the UHF beacon in which the traffic information 391 for the far-distance zone is set is transmitted with a predetermined electric wave strength (of e.g., 100 milliwatts) just enough to reach the entire far-distance zone 293 in the time T5.

In FIG. 8, (a) shows an example in which one-cycle time is assigned to the zones in the order of "the near-distance zone 291→the intermediate-distance zone 292→the far-distance zone 293" and a histogram covering a plurality of cycles forms a sawtooth shape.

In FIG. 8, (b) shows an example in which one-cycle time is assigned to the zones in the order of "the far-distance zone 293→the intermediate-distance zone 292→the near-distance zone 291" and a histogram covering a plurality of cycles forms a sawtooth shape.

In FIG. 8, (c) shows an example in which one-cycle time is assigned to the zones in the order of "the near-distance zone 291→the intermediate-distance zone 292→the far-distance zone 293→the intermediate-distance zone 292→the near-distance zone 291" and a histogram covering one cycle forms a hill-like shape.

Figure 9:
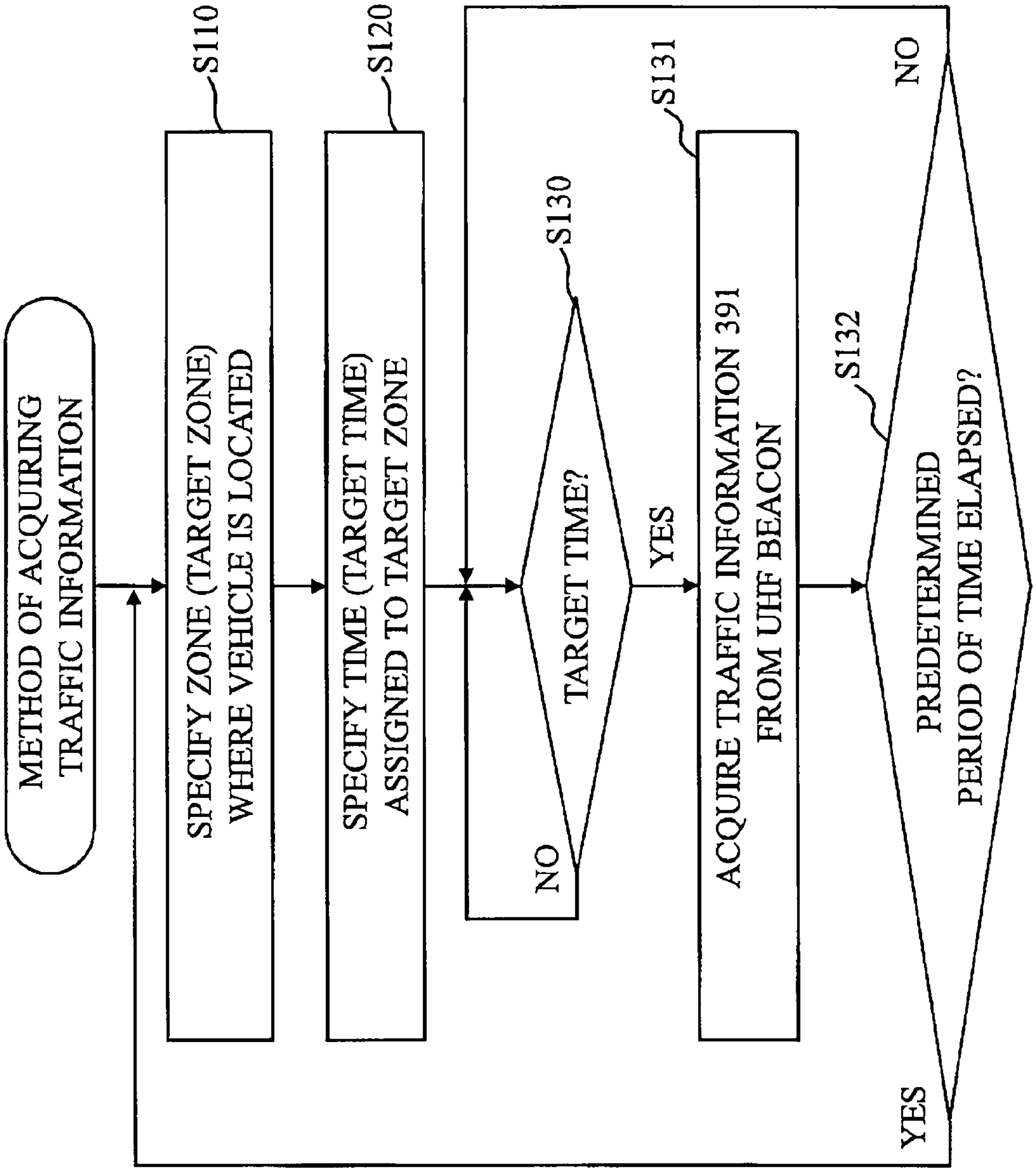
FIG. 9 is a flowchart showing a traffic information acquisition method of the in-vehicle unit 400 in Embodiment 2.

FIG. 9 is a flowchart showing a traffic information acquisition method of the in-vehicle unit 400 in Embodiment 2.

The traffic information acquisition method (an example of the driving support method) of the in-vehicle unit 400 in Embodiment 2 will be described hereinafter with reference to FIG. 9.

In the in-vehicle unit 400, the following process is performed together with the process shown in FIG. 9.

The UHF beacon communication part 412 constantly receives (detects) the UHF beacon distribution information of a predetermined frequency transmitted from the UHF beacon unit 112.

The position specifying part 420 specifies the vehicle position every predetermined period of time.

The in-vehicle unit storage part 490 stores the time-division information 392 and the zone information 393. The time-division information 392 and the zone information 393 are included in the traffic information 391 for the far-distance zone distributed by the UHF beacon and the traffic information 391 distributed by the DSRC beacon. Alternatively, the time-division information 392 and the zone information 393 may be registered in advance like the map data in the car-navi.

Based on the vehicle position specified by the position specifying part 420 and the zone information 393 stored in the in-vehicle unit storage part 490, the traffic information acquiring part 430 specifies the zone where the vehicle is located (S110).

The zone specified in S110 will be called "the target zone" hereinafter.

Based on the time-division information 392, the traffic information acquiring part 430 specifies the time assigned to the target zone (S120).

The time specified in S120 will be called "the target time" hereinafter. The target time represents the time, assigned to the target zone, of a cycle in which the UHF beacon is time-divided.

The traffic information acquiring part 430 awaits the target time (S130), and acquires the traffic information 391 from the UHF beacon distribution information received by the UHF beacon communication part 412 within the target time (S131).

The acquired traffic information is output to the car-navi and the driving control unit by the in-vehicle unit control part 440, and is used for presenting information to the driver for the purpose of safe driving and for driving control of the vehicle.

The traffic information acquiring part 430 repeatedly executes S130 through S131 for a predetermined period of time. For example, the traffic information acquiring part 430 repeatedly executes S130 through S131 during a time which is several times the cycle in which the UHF beacon is time-divided, or until the position specifying part 420 specifies the position next. When the predetermined period of time elapses, the process returns to S110 (S132).

Other than the UHF beacon distribution information for the near-distance zone 291, the UHF beacon distribution information for the intermediate-distance zone 292 and the UHF beacon distribution information for the far-distance zone 293 reach the near-distance zone 291.

Other than the UHF beacon distribution information for the intermediate-distance zone 292, the UHF beacon distribution information for the far-distance zone 293 reaches the intermediate-distance zone 292.

The traffic information acquiring part 430 of the in-vehicle unit 400 located in the near-distance zone 291 or intermediate-distance zone 292 specifies the target zone (S110), specifies the target time (S120), selects the UHF beacon distribution information transmitted during the target time (S130), and acquires the traffic information from the selected UHF beacon distribution information (S131).

As a result, the in-vehicle unit 400 can acquire the traffic information for the zone where the vehicle is located, among the plurality of traffic information.

In Embodiment 2, the following safety driving support system 100 was described.

By utilizing the propagation loss characteristic of the UHF electric wave, communication between the UHF beacon unit 112 and the in-vehicle unit is allowed in a region (in a range of about 100 m to 400 m away from the intersection 193) far from the reach range of the DSRC beacon signal.

This allows the vehicle driving in a region far from the intersection as well to receive the DSSS service (such as rear-end collision prevention service).

The reach range of the UHF beacon distribution information is concentrically divided (into the near-distance zone 291, the intermediate-distance zone 292, and the far-distance zone 293). Then, different information are provided to the different regions in a time-division manner.

This allows a seamless service (in which a plurality of services may be used as if a single service were being provided throughout the entire time) to be provided to the vehicle.

The in-vehicle unit grasps the position of the vehicle in which it is mounted, based on the road information provided through the UHF beacon distribution information and the result of the vehicle position measurement by the GPS mounted on the vehicle.

With this arrangement, the in-vehicle unit can appreciate the position of the vehicle on which it is mounted, even in the far-distance zone 293 in which the optical beacon unit 121 is not installed.

Embodiment 3

An embodiment of a driving safety support system 100 will be described in which a plurality of UHF beacon units 112 transmit UHF beacon distribution information without a crosstalk.

The configuration of the driving safety support system 100 is the same as those of Embodiments 1 and 2.

Figure 10:
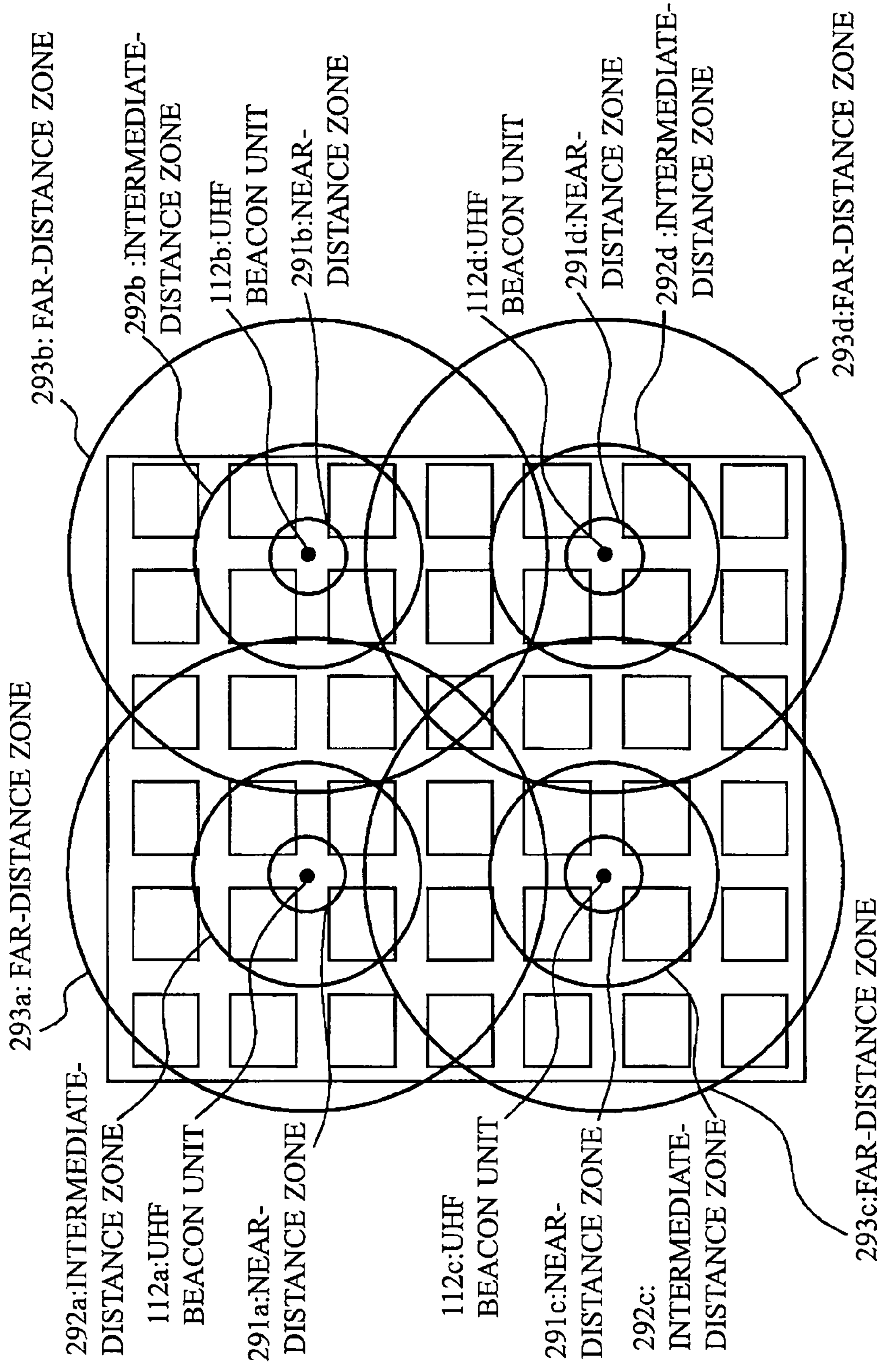
FIG. 10 is a diagram showing the zones of a UHF beacon unit 112 in Embodiment 3.

FIG. 10 is a diagram showing the zones of the UHF beacon unit 112 in Embodiment 3.

The positional relationship among the zones of four UHF beacon units 112*a* to 112*d* will be described below with reference to FIG. 10.

The four UHF beacon units 112*a* to 112*d* are disposed at different intersections, and are adjacent side by side or above and below. In FIG. 10, one UHF beacon unit 112 disposed at an intersection may be regarded as four UHF beacon units 112 disposed at one intersection (see FIG. 1).

Of the UHF beacon units 112*a* to 112*d*, far-distance zones 293*a* to 293*d* partially overlap. The far-distance zones 293*a* to 293*d* and intermediate-distance zones 292*a* to 292*d* partially overlap. In other words, the communication regions of the UHF beacon units 112*a* to 112*d* overlap in the far-distance zones 293*a* to 293*d* and intermediate-distance zones 292*a* to 292*d*. The intermediate-distance zones 292*a* to 292*d* of the UHF beacon units 112*a* to 112*d* do not overlap.

For example, assume that the ranges each with a radius of 200 m from the UHF beacon units 112*a* to 112*d* are defined as the intermediate-distance zones 292*a* to 292*d*, and that the ranges each with a radius of 400 m from the UHF beacon units 112*a* to 112*d* are defined as the far-distance zones 293*a* to 293*d*. In this case, the respective UHF beacon units 112*a* to 112*d* are disposed at intersections 193 which are distant from each other by 600 m to 800 m.

Figure 11:
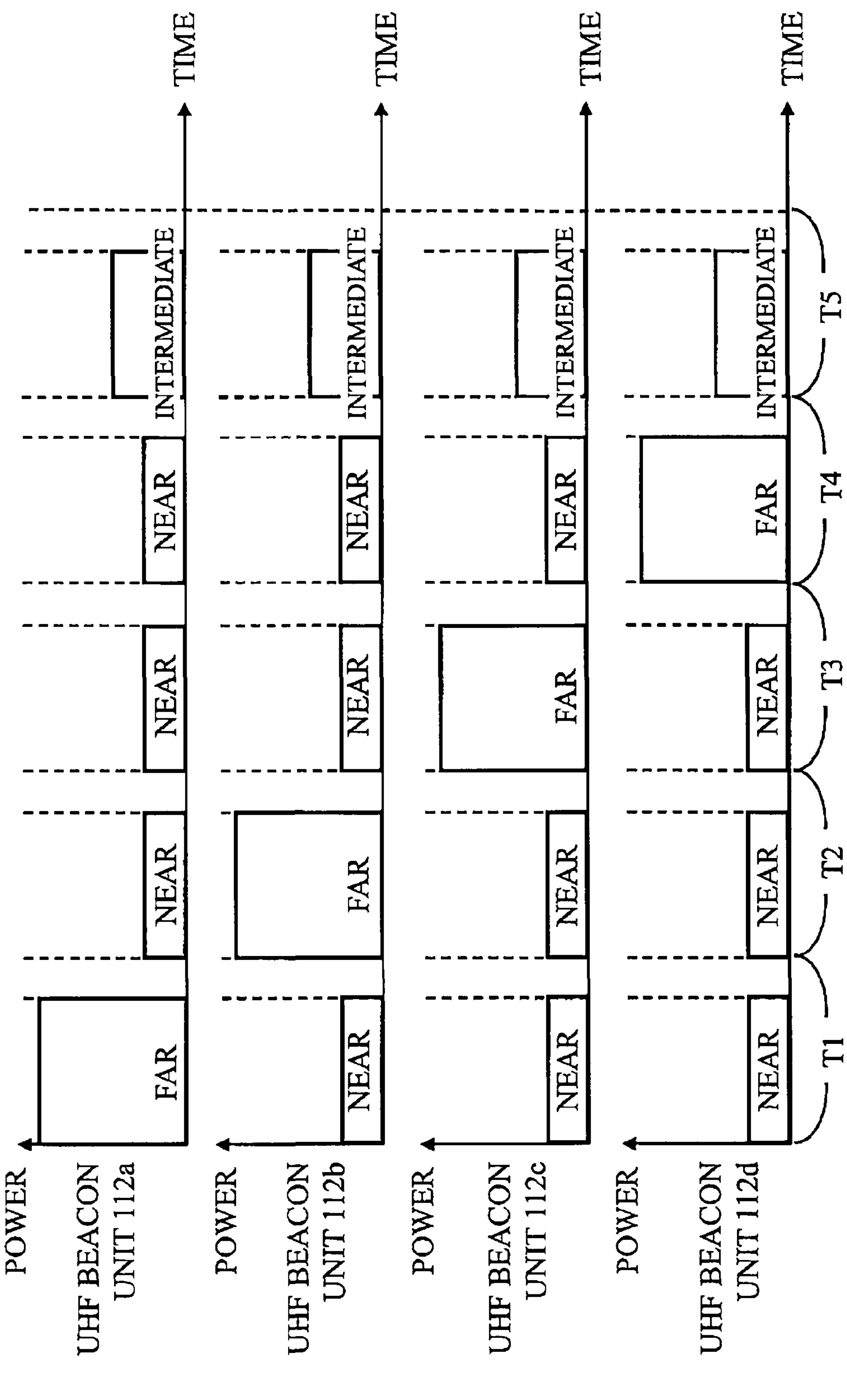
FIG. 11 is a chart showing the transmission timing of the UHF beacon in Embodiment 3.
Figure 12:
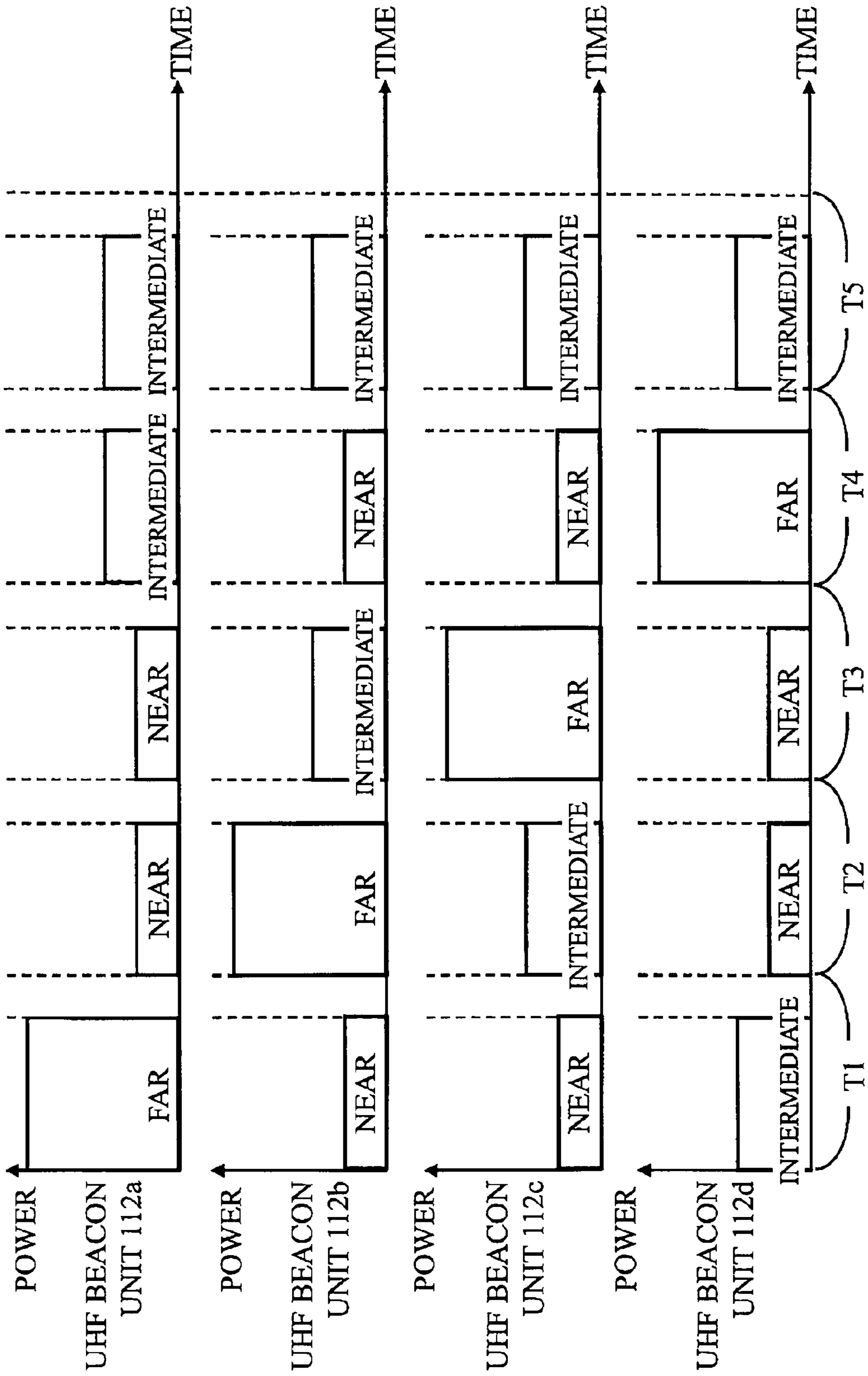
FIG. 12 is a chart showing the transmission timing of the UHF beacon in Embodiment 3.

FIGS. 11 and 12 are charts showing the transmission timing of the UHF beacon in Embodiment 3.

The timing at which each of the four UHF beacon units 112*a* to 112*d* transmits the UHF beacon will be described below with reference to FIGS. 11 and 12.

Four graphs respectively corresponding to the four UHF beacon units 112*a* to 112*d* each represent the time assigned to each zone, and the electric wave strength (power) of the UHF beacon transmitted to the corresponding zone, in the same manner as FIGS. 7 and 8.

The times assigned to the respective zones are set in time-division information 392 in units of UHF beacon units.

The time slot "near" where the electric wave strength is small is the time assigned to the near-distance zone 291. The time slot "intermediate" where the electric wave strength is intermediate is the time assigned to the intermediate-distance zone 292. The time slot "far" where the electric wave strength is large is the time assigned to the far-distance zone 293.

Each of the UHF beacon units 112*a* to 112*d* transmits the UHF beacon in which traffic information 391 for the corresponding zone is set, within the time assigned to the zone with an electric wave strength corresponding to the zone.

As shown in FIG. 10, of each of the four UHF beacon units 112*a* to 112*d*, the far-distance zone 293 overlaps the far-distance zone 293 and intermediate-distance zone 292 of the other UHF beacon units. The intermediate-distance zone 292 of each UHF beacon unit 112 does not overlap the intermediate-distance zones 292 of the other UHF beacon units 112.

Hence, each UHF beacon unit 112 transmits the UHF beacon distribution information to the near-distance zone 291 within time where the other UHF beacon units 112 transmit the UHF beacon distribution information to their far-distance zones 293, so the respective UHF beacon distribution information do not reach the same region in the same time. Also, each UHF beacon unit 112 transmits the UHF beacon distribution information to the intermediate-distance zone 292 within the time where no UHF beacon unit 112 transmits the UHF beacon distribution information to its far-distance zone 293. For example, all the UHF beacon units 112 transmit the UHF beacon distribution information to their intermediate-distance zones 292 within the same time (see FIG. 11).

In other words, the UHF beacon units 112 transmit the UHF beacon distribution information for the overlap regions in different times. This prevents crosstalk (interference) of the UHF beacon distribution information caused by the in-vehicle units 400 located at the overlap region.

The overlap region is the region where the far-distance zones overlap, or the region where a far-distance zone 293 and an intermediate-distance zone 292 overlap. UHF beacon distribution information from the plurality of UHF beacon units 112 reach the overlap region.

The intermediate-distance zones 292 of two diagonally opposite UHF beacon units 112 (112*a* and 112*d*) (112*b* and 112*c*) do not overlap (see FIG. 10).

Therefore, each UHF beacon unit 112 may distribute the UHF beacon distribution information to its intermediate-distance zone 292 even during the time where a diagonally opposite UHF beacon unit 112 transmits the UHF beacon distribution information to its far-distance zone 293 (see FIG. 12).

In the overlap region, an in-vehicle unit 400 (traffic information acquiring part 430) specifies the moving direction of the vehicle. The in-vehicle unit 400 also specifies the time where a UHF beacon unit 112 located in the specified moving direction transmits the UHF beacon distribution information toward the region where the vehicle is located. The in-vehicle unit 400 selects the UHF beacon distribution information received in the specified time, and acquires traffic information from the selected UHF beacon distribution information.

Each of the UHF beacon units 112 (not shown) disposed around any one of the UHF beacon units 112*a* to 112*d* transmits the UHF beacon distribution information for the overlap region in the time different from the time where an adjacent UHF beacon unit 112 does.

For example, the UHF beacon units 112 disposed around the UHF beacon unit 112*b* transmit UHF beacon distribution information for the overlap regions in the following manner in times different from the times where the UHF beacon unit 112*b* does.

The UHF beacon unit 112 disposed upwardly adjacent to the UHF beacon unit 112*b* transmits the UHF beacon distribution information for the respective zones at the same timings as those at which the UHF beacon unit 112*d* disposed downwardly adjacent to the UHF beacon unit 112*b* does.

The UHF beacon unit 112 disposed adjacent to the right of the UHF beacon unit 112*b* transmits the UHF beacon distribution information for the respective zones at the same timings as those at which the UHF beacon unit 112*a* disposed adjacent to the left of the UHF beacon unit 112*b* does.

The UHF beacon unit 112 disposed at the upper right of the UHF beacon unit 112*b* transmits the UHF beacon distribution information for the respective zones at the same timings as those at which the UHF beacon unit 112*c* disposed at the lower left of the UHF beacon unit 112*b* does.

The respective UHF beacon units 112 transmit UHF beacon distribution information having the same frequency. Moreover, in each UHF beacon unit 112, the frequency of the UHF beacon distribution information can be set at the same frequency of the UHF beacon distribution information employed for vehicle-to-vehicle communication. This simplifies the function of the in-vehicle unit 400, because as far as the in-vehicle unit 400 can receive one frequency, it can acquire traffic information from any UHF beacon unit 112, and can perform vehicle-to-vehicle communication as well.

Note that adjacent UHF beacon units 112 may as well transmit UHF beacons having different frequencies, and the UHF beacon unit 112 may as well transmit UHF distribution information having a frequency different from that of the UHF beacon employed for vehicle-to-vehicle communication.

Figure 13:
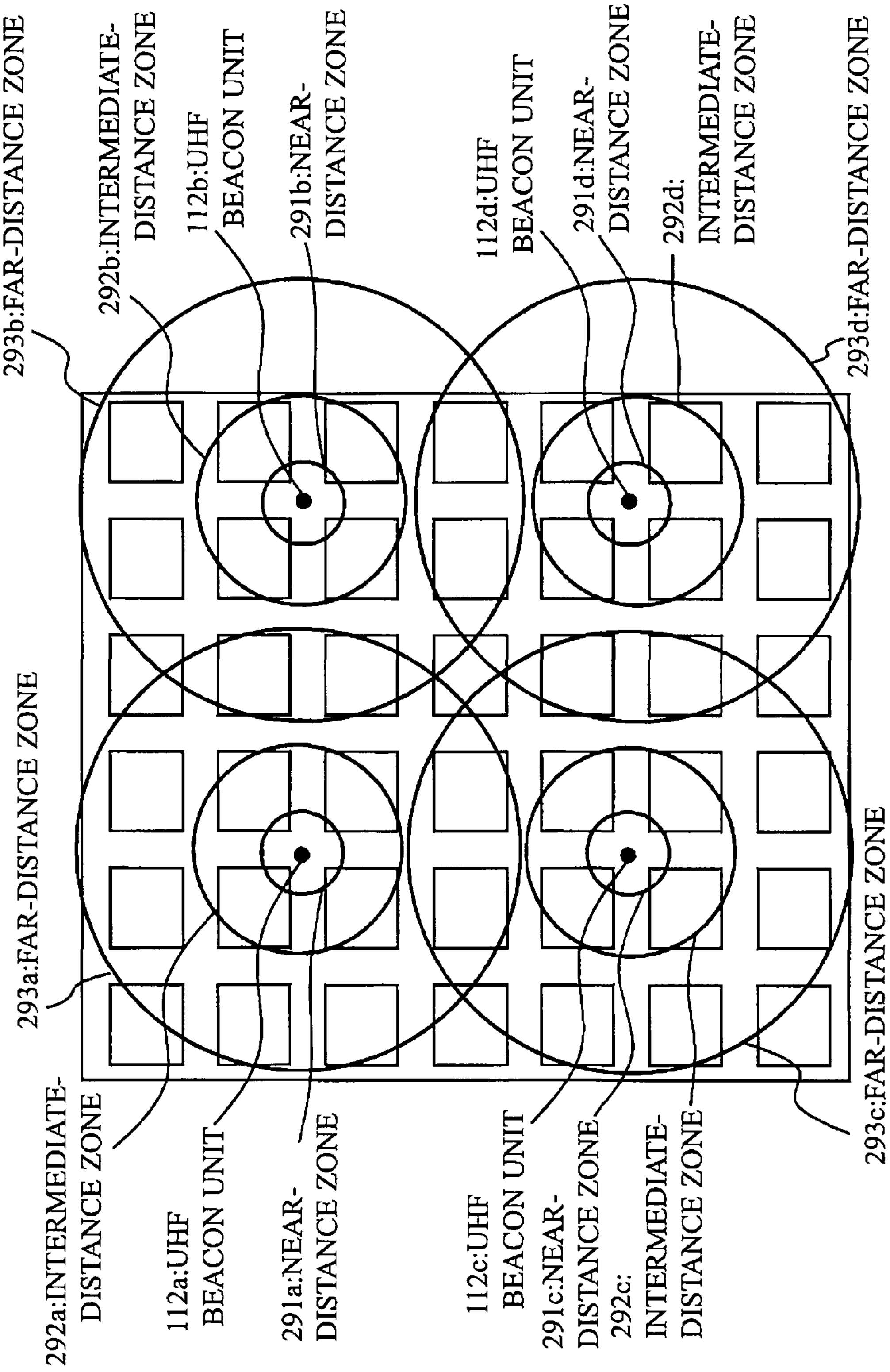
FIG. 13 is a diagram showing another example of the zones of the UHF beacon units 112 in Embodiment 3.

FIG. 13 is a diagram showing another example of the zones of the UHF beacon units 112 in Embodiment 3.

Figure 14:
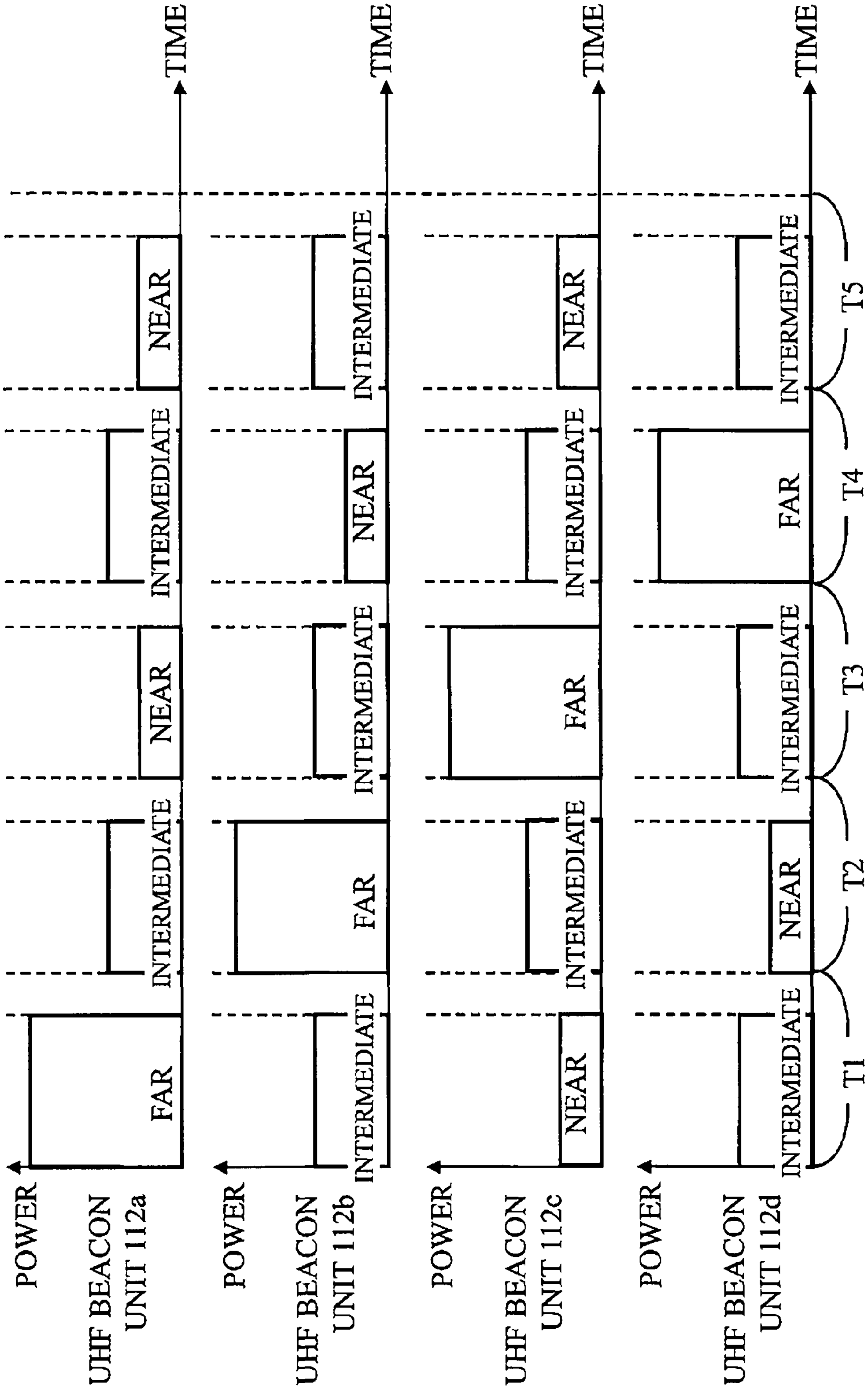
FIG. 14 is a chart showing another example of the transmission timing of the UHF beacon in Embodiment 3.

FIG. 14 is a chart showing another example of the transmission timing of the UHF beacon in Embodiment 3.

In a case where the far-distance zones 293 of the UHF beacon units 112 do not overlap the intermediate-distance zones 292 of the other UHF beacon units 112 (see FIG. 13), each UHF beacon unit 112 may transmit the UHF beacon distribution information for the near-distance zone 291 or intermediate-distance zone 292 while the other UHF beacon units 112 transmit the UHF beacon distribution information for the far-distance zones 293 (see FIG. 14).

Figure 15:
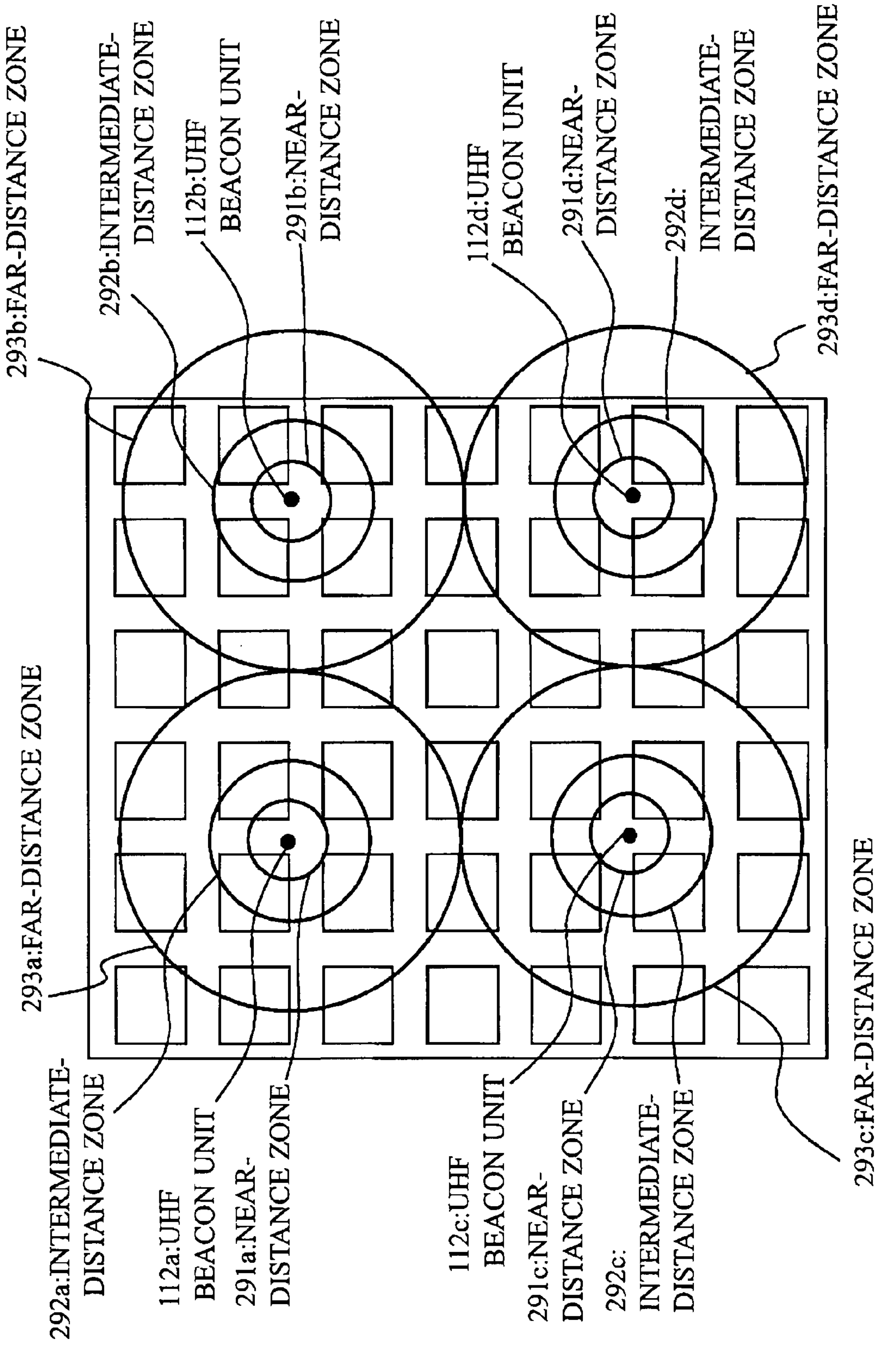
FIG. 15 is a chart showing another example of the zones of the UHF beacon units 112 in Embodiment 3.

FIG. 15 is a chart showing still another example of the zones of the UHF beacon units 112 in Embodiment 3.

As shown in FIG. 15, in a case where the far-distance zones 293 of the respective UHF beacon units 112*a* to 112*d* do not overlap, the respective UHF beacon units 112*a* to 112*d* may as well transmit the UHF beacon distribution information for the far-distance zones 293 at the same time.

In Embodiment 3, the driving safety support systems 100 as follows were described.

The plurality of UHF beacon units 112 transmit the UHF beacon distribution information for the overlap regions in different times.

This may prevent frequency interference (crosstalk) of the UHF beacon distribution information even if the plurality of UHF beacon units 112 are disposed in such a manner that the communication regions (the UHF beacon reach ranges) overlap.

Embodiment 4

An embodiment will now be described wherein, in driving safety support systems 100, an in-vehicle unit notifies a UHF beacon unit 112 of warning information detected by the vehicle, and the UHF beacon unit 112 distributes the warning information notified by the in-vehicle unit to another vehicle.

When an accident has occurred ahead, for example, the driver depresses a hazard button (or a warning button provided dedicatedly) (an example of an input device).

When the hazard button has been depressed, the in-vehicle unit transmits a UHF beacon signal in which the warning information indicating warning has been set.

The UHF beacon unit 112 that has received the UHF beacon signal transmitted from the in-vehicle unit transmits each UHF beacon signal in which the warning information has been set, for the near-distance zone 291, intermediate-distance zone 292, and a far-distance zone 293.

This allows provision of the warning information (such as accident information) detected by the in-vehicle unit to a vehicle running in each zone.

For example, the in-vehicle unit transmits the warning information using a UHF beacon signal having a frequency different from that of the UHF beacon distribution information transmitted by the UHF beacon unit 112.

In Embodiment 4, the driving safety support systems 100 as follows were described.

When an unexpected accident has occurred, a certain vehicle provides emergency information (warning information) to all vehicles through the UHF beacon unit 112, using a dedicated frequency channel.

This allows notification of occurrence of the unexpected accident even to a vehicle in the far-distance zone 293.

REFERENCE SIGNS LIST

100 driving safety support systems, 110 roadside apparatus, 111, 111*a*, 111*b* DSRC beacon unit, 112, 112*a*, 112*b*, 112*c*, 112*d* UHF beacon unit, 113 image sensor, 120 optical roadside apparatus, 121 optical beacon unit, 130 roadside control unit, 191 main road, 192 sub-road, 193 intersection, 194 traffic light, 195 signal controller, 199 vehicle, 199*a* large-sized vehicle, 199*b* standard-sized vehicle, 201 non-shadowing, 202 DSRC beacon, 203 UHF beacon, 291, 291*a*, 291*b*, 291*c*, 291*d* near-distance zone, 292, 292*a*, 292*b*, 292*c*, 292*d* intermediate-distance zone, 293, 293*a*, 293*b*, 293*c*, 293*d* far-distance zone, 310 UHF unit communication part, 320 UHF unit control part, 390 UHF unit storage part, 391 traffic information, 392 time-division information, 393 zone information, 400 in-vehicle unit, 411 DSRC beacon communication part, 412 UHF beacon communication part, 413 optical beacon communication part, 420 position specifying part, 430 traffic information acquiring part, 440 in-vehicle unit control part, 490 in-vehicle unit storage part, 491 driving information

The invention claimed is:

1. A driving support system comprising:

a UHF (Ultra High Frequency) roadside apparatus and an in-vehicle unit mounted in a vehicle, wherein the UHF roadside apparatus includes, a UHF transmission part which transmits traffic information for a circular region centering on the UHF roadside apparatus, traffic information for a first doughnut-shaped region surrounding the circular region, and traffic information for a second doughnut-shaped region surrounding the first doughnut-shaped region, in a time-division manner using UHF waves having the same frequency, and wherein the in-vehicle unit mounted in the vehicle includes, a UHF reception part which receives the UHF waves transmitted by the UHF roadside apparatus, a position specifying part which specifies a position of the vehicle, a region specifying part which specifies a vehicle region where the vehicle is located, of the circular region and the first doughnut-shaped region and the second doughnut-shaped region, based on the position of the vehicle specified by the position specifying part, a UHF selection part which selects, of the UHF waves received by the UHF reception part, a UHF wave received during a time assigned to the vehicle region specified by the region specifying part, and a traffic information acquiring part which acquires traffic information from the UHF wave selected by the UHF selection part, wherein the UHF transmission part of the UHF roadside apparatus, for each transmission cycle where the traffic information for the circular region, the first doughnut-shaped region, and the second doughnut-shaped region are respectively transmitted, assigns to the circular region a time allocation within the transmission cycle which is longer than each of the time allocations respectively assigned to the second doughnut-shaped region and the first doughnut-shaped region, and transmits the traffic information for the respective regions in a time-division manner using the UHF waves having the same frequency.

2. The driving support system according to claim 1, wherein the UHF transmission part of the UHF roadside apparatus transmits the traffic information for the circular region, the first doughnut-shaped region, and the second doughnut-shaped region with electric wave strengths such that the electric wave strengths increase in the order named, in a time-division manner using the UHF waves having the same frequency.

* * * * *